United States Patent
Tsutsumi et al.

(10) Patent No.: US 11,669,080 B2
(45) Date of Patent: Jun. 6, 2023

(54) ABNORMALITY DETECTION DEVICE, ABNORMALITY DETECTION METHOD, AND PROGRAM

(71) Applicant: Japan Aerospace Exploration Agency, Tokyo (JP)

(72) Inventors: Seiji Tsutsumi, Chofu (JP); Miki Hirabayashi, Chofu (JP)

(73) Assignee: JAPAN AEROSPACE EXPLORATION AGENCY

( * ) Notice: Subject to any disclaimer, the term of this patent is extended or adjusted under 35 U.S.C. 154(b) by 65 days.

(21) Appl. No.: 17/288,611

(22) PCT Filed: Oct. 29, 2019

(86) PCT No.: PCT/JP2019/042252
§ 371 (c)(1),
(2) Date: Apr. 26, 2021

(87) PCT Pub. No.: WO2020/090770
PCT Pub. Date: May 7, 2020

(65) Prior Publication Data
US 2021/0397175 A1 Dec. 23, 2021

(30) Foreign Application Priority Data
Oct. 30, 2018 (JP) .............................. JP2018-204515

(51) Int. Cl.
*G05B 23/02* (2006.01)
*G01D 21/02* (2006.01)

(52) U.S. Cl.
CPC ......... *G05B 23/0221* (2013.01); *G01D 21/02* (2013.01); *G01D 2218/10* (2021.05)

(58) Field of Classification Search
CPC .... G05B 23/0221; G05B 23/00; G05B 23/02; G05B 23/0205; G05B 23/0208;
(Continued)

(56) References Cited

U.S. PATENT DOCUMENTS 10,878,385 B2 * 12/2020 Horrell .................. G06F 9/5044
2002/0039025 A1 * 4/2002 Shiba .................... B62D 5/049
324/318
(Continued)

FOREIGN PATENT DOCUMENTS

JP 2004045041 A * 2/2004
JP 2010-191556 A 9/2010
(Continued)

OTHER PUBLICATIONS

European Search Report, dated Jul. 1, 2022, issued in corresponding European Patent application No. 19880340.5.
(Continued)

*Primary Examiner* — Daniel R Miller
*Assistant Examiner* — Eric Sebastian Von Wald
(74) *Attorney, Agent, or Firm* — Ostrolenk Faber LLP

(57) ABSTRACT

An abnormality detection device includes an acquirer configured to acquire a plurality of detection results of a plurality of sensors that have detected a state of a detection target at predetermined time intervals and an estimator configured to estimate a specific sensor among the plurality of sensors on the basis of a plurality of mode information acquisition process data elements for enabling various types of feature extraction according to properties of the abnormality obtained from a plurality of detection results acquired by the acquirer.

18 Claims, 10 Drawing Sheets

(58) Field of Classification Search
CPC ............ G05B 23/021; G05B 223/0213; G05B 23/0218; G05B 23/0224; G05B 23/0229; G05B 23/0232; G05B 23/0237; G05B 23/024; G05B 23/0243; G05B 23/0251; G05B 23/0254; G01D 21/02; G01D 2218/10; G01D 2218/00
See application file for complete search history.

(56) References Cited

U.S. PATENT DOCUMENTS

| | | |
|---|---|---|
| 2002/0193891 A1 | 12/2002 | Ushiku |
| 2011/0270579 A1 | 11/2011 | Watson et al. ................ 702/189 |
| 2012/0041575 A1 | 2/2012 | Maeda et al. .................. 700/80 |
| 2015/0213706 A1 | 7/2015 | Bai et al. |
| 2019/0041842 A1* | 2/2019 | Celia ..................... H04L 1/1874 |
| 2020/0033831 A1* | 1/2020 | Tauschinsky ........ G05B 23/024 |

FOREIGN PATENT DOCUMENTS

| | | |
|---|---|---|
| JP | 2017-156201 A | 9/2017 |
| JP | 2018-081523 A | 5/2018 |
| WO | WO 2014/034273 A1 | 3/2014 |

OTHER PUBLICATIONS

International Search Report dated Dec. 3, 2019 in corresponding PCT International Application No. PCT/JP2019/042252.
Written Opinion dated Dec. 3, 2019 in corresponding PCT International Application No. PCT/JP2019/042252.

* cited by examiner

FIG. 5

SEGMENTATION OF DATA ACCORDING TO SLIDING WINDOW
(WINDOW WIDTH = 5)

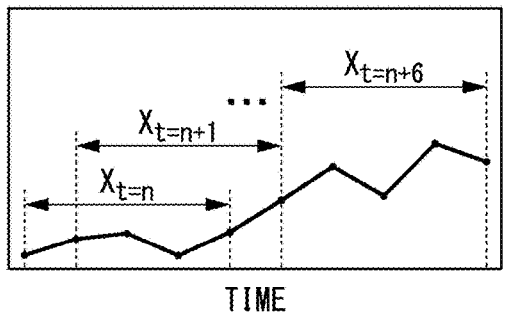

TIME

CONVERT TIME-SERIES DATA INTO SET OF VECTORS (CREATE PARTIAL TIME SERIES)
AND CALCULATE LAG STRUCTURE $$X_{t=n} = [X_{t=n+4}, X_{t=n+3}, X_{t=n+2}, X_{t=n+1}, X_{t=n}]$$

INTRODUCE TIME STRUCTURE AS LAG STRUCTURE INTO DATA
THROUGH DIMENSION REDUCTION ACCORDING TO PRINCIPAL COMPONENT ANALYSIS OF
FIRST TIME (RECONSTRUCTION OF DATA BASED ON PRINCIPAL COMPONENT SCORE)

FIRST PRINCIPAL COMPONENT (1PC) $X_{1pc(t=n)} = a^x_{1pc(1)} X_{t=n} + a^x_{1pc(2)} X_{t=n+1} + \cdots + a^x_{1pc(5)} X_{t=n+4}$ SECOND PRINCIPAL COMPONENT (2PC) $X_{2pc(t=n)} = a^x_{2pc(1)} X_{t=n} + a^x_{2pc(2)} X_{t=n+1} + \cdots + a^x_{2pc(5)} X_{t=n+4}$ THIRD PRINCIPAL COMPONENT (3PC) $X_{3pc(t=n)} = a^x_{3pc(1)} X_{t=n} + a^x_{3pc(2)} X_{t=n+1} + \cdots + a^x_{3pc(5)} X_{t=n+4}$ FOURTH PRINCIPAL COMPONENT (4PC) $X_{4pc(t=n)} = a^x_{4pc(1)} X_{t=n} + a^x_{4pc(2)} X_{t=n+1} + \cdots + a^x_{4pc(5)} X_{t=n+4}$ FIFTH PRINCIPAL COMPONENT (5PC) $X_{5pc(t=n)} = a^x_{5pc(1)} X_{t=n} + a^x_{5pc(2)} X_{t=n+1} + \cdots + a^x_{5pc(5)} X_{t=n+4}$ \* PRINCIPAL COMPONENT SCORE: VALUE OF DATA ON AXIS OF
  EACH PRINCIPAL COMPONENT
  TREND OR RELATIONSHIP BETWEEN PRINCIPAL COMPONENTS OF ENTITIES
  CAN BE EVALUATED FROM VALUE

ABNORMALITY DETECTION DEVICE, ABNORMALITY DETECTION METHOD, AND PROGRAM

CROSS-REFERENCE TO RELATED APPLICATIONS

The present application is a 35 U.S.C. §§ 371 national phase conversion of PCT/JP2019/042252, filed Oct. 29, 2019, which claims priority to Japanese Patent Application No. 2018-204515, filed Oct. 30, 2018, the contents of which are incorporated herein by reference. The PCT International Application was published in the Japanese language.

TECHNICAL FIELD

The present invention relates to an abnormality detection device, an abnormality detection method, and a program.

BACKGROUND ART

Conventionally, there is a method of acquiring a detection result of a sensor provided in a system and detecting that there is an abnormality when a value indicated by the acquired detection result exceeds a preset threshold value so that damage caused by an abnormality is minimized in various types of systems (reactors, aircraft engines, railway networks, life support systems, and the like) (for example, Patent Literature 1).

CITATION LIST

Patent Literature

[Patent Literature 1]
Japanese Unexamined Patent Application, First Publication No. 2017-156201

SUMMARY OF INVENTION

Technical Problem

However, in the conventional technology, it may be difficult to detect an abnormality because a threshold value changes in correspondence with a change in an operation condition or an environment. Also, when it is difficult to set the threshold value, it is difficult to determine the occurrence of an abnormality at the predictive stage.

The present invention has been made in consideration of such circumstances and an objective of the present invention is to provide an abnormality detection device, an abnormality detection method, and a program capable of estimating a sensor in which an abnormality is likely to occur without presetting a threshold value.

Solution to Problem

According to an aspect of the present invention, an abnormality detection device is provided including an acquirer configured to acquire a plurality of detection results of a plurality of sensors that have detected a state of a detection target at predetermined time intervals and an estimator configured to estimate a specific sensor in which an abnormality is likely to occur among the plurality of sensors on the basis of a plurality of mode information elements obtained by performing a plurality of mode information acquisition processes of extracting features according to properties of the abnormality with respect to each of the plurality of detection results acquired by the acquirer.

Advantageous Effects of Invention

According to the present invention, it is possible to estimate a sensor in which an abnormality is likely to occur without presetting a threshold value.

BRIEF DESCRIPTION OF DRAWINGS

FIG. 5 is a diagram showing an example of a "first mode information acquisition process.

DESCRIPTION OF EMBODIMENTS

Figures 1, 2:
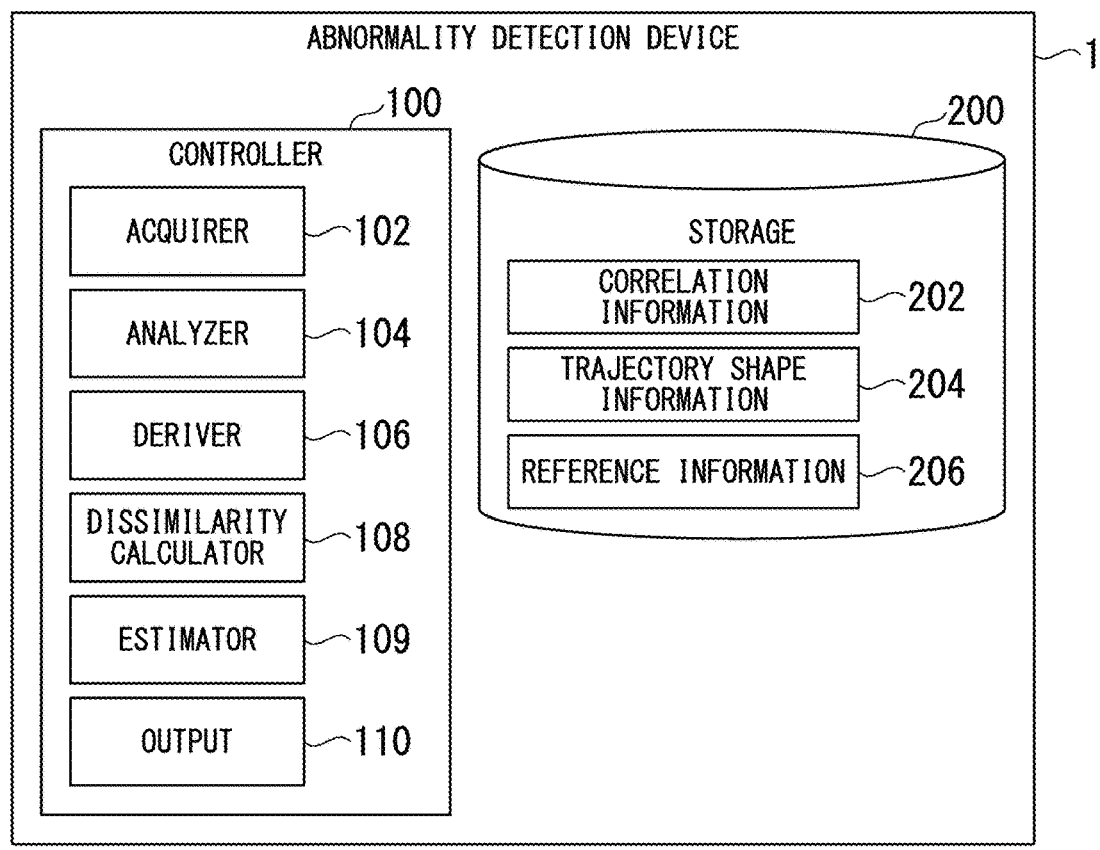
FIG. 1 is a diagram showing an example of a configuration of an abnormality detection device 1 according to an embodiment.
FIG. 2 is a diagram showing an example of content of detection result information 300.

<Embodiments>
Hereinafter, embodiments of the present invention will be described with reference to the drawings.
[Overall Configuration]
FIG. 1 is a diagram showing an example of a configuration of an abnormality detection device 1 according to an embodiment. The abnormality detection device 1 detects an abnormality that has occurred in an abnormality detection target device or system. The abnormality detection device 1 includes, for example, a controller 100 and a storage 200. The controller 100 implements an acquirer 102, an analyzer 104, a deriver 106, a dissimilarity calculator 108, an estimator 109, and an output 110 as functional units, for example, when a hardware processor such as a central processing unit (CPU) executes a program (software) stored in the storage 200. Also, some or all of these components may be implemented, for example, by hardware (a circuit including circuitry) such as a large-scale integration (LSI)

circuit, an application specific integrated circuit (ASIC), a field-programmable gate array (FPGA), or a graphics processing unit (GPU) or may be implemented by software and hardware in cooperation.

The storage 200 may be implemented by, for example, a storage device (a storage device including a non-transient storage medium) such as a hard disk drive (HDD) or a flash memory or may be implemented by a removable storage medium (a non-transient storage medium) such as a DVD or a CD-ROM or may be a storage medium mounted on a drive device. Also, part or all of the storage 200 may be an external device that can be accessed by the abnormality detection device 1 such as a network attached storage (NAS) or an external storage server. For example, correlation information 202, trajectory shape information 204, and reference information 206 are stored in the storage 200. Details of various types of information will be described below.

The acquirer 102 acquires information representing a plurality of detection results (hereinafter referred to as detection result information 300) when a plurality of sensors (not shown) disposed in the abnormality detection target device or system have observed a state of a detection target at predetermined time intervals. The detection target is, for example, a physical quantity that changes in the abnormality detection target device or system and the state of the detection target is, for example, a value of the physical quantity. For example, the physical quantity may indicate at least one of mechanical properties, electromagnetic properties, thermal properties, acoustic properties, chemical properties, and the like or may be space information or time information represented thereby. The physical quantity includes, for example, a pressure, a flow rate, a degree of valve opening, an atmospheric pressure, an outside air temperature, a water temperature, a blood pressure, a pulse and the like. The abnormality detection target device or system is, for example, a rocket (for example, an engine system of a reusable rocket), a transportation system, a power generation device, a life support device, or the like. When the abnormality detection target system is a rocket engine system, a plurality of sensors are mounted in the rocket to detect a detection target (a physical quantity) for ascertaining a state of the engine system.

The abnormality detection target device or system is not limited to an engine system or a power generation device of rockets and may be any device or system capable of acquiring a physical quantity of a detection target. Also, in addition to the detection result information 300, the acquirer 102 may be configured to acquire information necessary for detecting an abnormality or estimating the type and the cause of an abnormality and the like, if necessary.

For example, the acquirer 102 may acquire the detection result information 300 from a plurality of sensors connected to the abnormality detection device 1, may acquire the detection result information 300 from the connected sensors so that information can be transmitted and received via a network, or may acquire (extract) the detection history of a sensor included in the operation history (for example, log information) of the abnormality detection target whose operation has been completed as the detection result information 300. In the following description, a case in which the acquirer 102 acquires the detection result information 300 from the log information stored in a data logger will be described. The sensor is an example of a "detector."

FIG. 2 is a diagram showing an example of content of the detection result information 300. In the detection result information 300, for example, information for identifying the sensor (a sensor ID shown in FIG. 2), the sensor name, and the detection result when the sensor has detected a physical quantity which is the detection target at predetermined time intervals are stored in association with each other separately for each sensor. In FIG. 2, in the sensor having a sensor ID "0001" and the sensor name "sensor A," a detection target is time-series information of an abnormality detection target and a detection result represents a measured value (for example, a temperature, a pressure, a flow rate, or the like) measured (detected) by the sensor.

Returning to FIG. 1, the analyzer 104 acquires a plurality of mode information elements according to a feature of an abnormality by analyzing detection results of a plurality of univariates acquired by the acquirer 102 according to a matrix decomposition method (for example, principal component analysis) used for multivariate analysis.

For example, the deriver 106 visualizes mode information by deriving a trajectory on a phase plane or a phase space on the basis of the mode information acquired by the analyzer 104. Details of the deriver 106 and the dissimilarity calculator 108 for calculating an index (hereinafter referred to as dissimilarity) used by the estimator 109 when the estimator 109 estimates a specific sensor on the basis of visualized information derived by the deriver 106 will be described below.

For example, the estimator 109 estimates whether or not a sensor, which has detected each detection result, shows an abnormal value (hereinafter referred to as a specific sensor) on the basis of at least one of the detection result information 300 acquired from the acquirer 102 and the mode information acquired by the analyzer 104 and on the basis of at least one of a trajectory derived by the deriver 106 and dissimilarity calculated by the dissimilarity calculator. Abnormalities which are detected include, for example, various abnormalities such as a change in periodicity, incorporation of irregular noise, and a change in a measured value that do not occur at a normal time. Also, types of abnormalities include, for example, an abnormality in an abnormality detection target device or system (hereinafter referred to as a system abnormality) and an abnormality in a sensor (hereinafter referred to as a sensor abnormality).

The output 110 outputs information related to the sensor estimated to be the specific sensor by the estimator 109. For example, the output 110 may display an image representing the specific sensor on a display device (not shown) connected to the abnormality detection device 1, may display information representing the specific sensor on another device connected via a network, or may cause the storage 200 to store the information representing the specific sensor. Also, the output 110 may cause the storage 200 to store a detection result acquired by the acquirer 102, mode information acquired by the analyzer 104, information representing the trajectory derived by the deriver 106, dissimilarity calculated by the dissimilarity calculator 108, and the like. Also, the storage 200 may be configured separately from the abnormality detection device 1.

[Process of Analyzer 104]

Details of the process of the analyzer 104 will be described below. First, for example, the analyzer 104 converts time-series univariate information into a set of vectors having a measured value of a near point called a partial time series as an element using a sliding window method which is known technology or the like according to the detection results acquired by the acquirer 102. Thereby, the analyzer 104 reconstructs the detection result to multivariate data having a measured value of a near point as a variable. When multivariate analysis is performed on the detection result reconstructed according to the sliding window method using the principal component analysis method in which a plurality of mode information elements can be acquired, the analyzer 104 not only can incorporate a time structure (a lag structure) in the principal component analysis result but also can acquire a plurality of mode information elements from detection results as many as the number of window widths. Details of the sliding window method will be described below. The plurality of mode information elements obtained as described above represent abnormalities having different properties (a change in periodicity, incorporation of irregular noise, a change in a measured value, and the like). The estimator 109 determines various abnormalities on the basis of mode information acquired by the analyzer 104.

In the following description, as a process which is performed by the analyzer 104, a mode information acquisition process which is performed using a multivariate analysis method (for example, principal component analysis) in which time-series information of a single sensor is reconstructed to multivariate data, the multivariate is vectorized using a lag structure, and a plurality of mode information elements can be acquired will be described as a "first mode information acquisition process." On the other hand, as a process which is performed by the analyzer 104, a mode information acquisition process which is performed using a multivariate analysis method (for example, principal component analysis) in a general time domain to be executed by collecting and vectorizing time-series information of two or more sensors at time intervals, reconstructing the vectorized time-series information to multivariate data, and treating the multivariate data as a plurality of independent multivariate data elements will be described as a "second mode information acquisition process."

When the analyzer 104 performs multivariate analysis by integrating two or more sensors and collectively performing the multivariate analysis according to the "second mode information acquisition process," the analyzer 104 can acquire the mode information from a viewpoint different from that of the "first mode information acquisition process." Also, in a case in which the "second mode information acquisition process" using the principal component analysis is performed unlike a case in which mode information elements as many as the number of window widths when a sliding window method is used are extracted in the "first mode information acquisition process" using the principal component analysis, the analyzer 104 can acquire a plurality of mode information elements as many as the number of sensors using reconstruction of multivariate data. Also, because the analyzer 104 acquires the mode information on the basis of the detection results of a plurality of sensors at once in the "second mode information acquisition process," it is possible to reduce the calculation when the number of sensors provided in the abnormality detection target is larger than that of the "first mode information acquisition process" in which mode information is acquired for each sensor.

For example, the analyzer 104 sets a detection result before the mode information acquisition process (hereinafter referred to as $0^{th}$-order mode information) among detection results of a single sensor represented in the detection result information 300 or data obtained by standardizing the detection result of the sensor (hereinafter referred to as standardized $0^{th}$-order mode information) as target data of the "first mode information acquisition process." Also, for example, the analyzer 104 sets the "$0^{th}$-order mode information," the "standardized $0^{th}$-order mode information," "first- to higher-order mode information which is first mode information acquisition results," "first- to higher-order mode information which is standardized first mode information acquisition results," and the like as target data of the "second mode information acquisition process."

The analyzer 104 can acquire a lag structure lost in the "second mode information acquisition process" by performing the "second mode information acquisition process" using data on which the "first mode information acquisition process" has been performed as described above. This is due to the following reasons. The lag structure is incorporated in the "first mode information acquisition process" data in which the data is reconstructed and multivariate analysis is performed using the sliding window method. On the other hand, because the analyzer 104 reconstructs time-series information of two or more sensors to multivariate data by collecting and vectorizing the time-series information at time intervals in the case of the "second mode information acquisition process," a correlation between data elements is lost. The analyzer 104 can recover the correlation lost at the time of mode information acquisition using a result of the "first mode information acquisition process" in which the lag structure is introduced as the time-series information of the sensor in the "second mode information acquisition process."

The analyzer 104 performs the "first mode information acquisition process" which is executed for each sensor or the "second mode information acquisition process" which is executed for a combination of two or more sensors on the basis of the detection result information 300 acquired by the acquirer 102 and extracts features of various abnormalities such as an abnormality for which a threshold value is not set and an abnormality for which it is difficult to set a threshold value (a change in periodicity, incorporation of irregular noise, and the like) according to a plurality of mode information elements. In the following description, a method in which the analyzer 104 acquires mode information for acquiring features of various abnormalities will also be described as (1) "mode information acquisition method of extracting features of various abnormalities."

[Process of Deriver 106]

Details of the process of the deriver 106 will be described below. The deriver 106 visualizes the mode information according to a known method (for example, a phase plane method) on the basis of a plurality of mode information elements acquired by the analyzer 104. Hereinafter, a case in which the deriver 106 derives a trajectory on the phase plane or the phase space on the basis of the plurality of mode information elements acquired by the analyzer 104 and visualizes the mode information will be described. Thereby, the deriver 106 can enlarge a feature of a change in the detection result according to the derived trajectory and allow an observer of the trajectory to detect even a slight change without overlooking such a slight change. Furthermore, the deriver 106 can allow the observer of the trajectory to perform the detection of an abnormality, the estimation of a type and a cause of the abnormality, and the like with high visibility in a state in which much physical information is retained according to the derived trajectory. Also, in the following description, a method in which the deriver 106 derives a trajectory on the phase plane or the phase space on the basis of a plurality of mode information elements acquired by the analyzer 104 will be described as (2) "method of visualizing mode information using a trajectory shape."

[Process of Dissimilarity Calculator 108]

The dissimilarity calculator 108 calculates dissimilarity for quantifying the trajectory shape difference from a normal time, for example, in relation to a trajectory shape derived on a phase plane by the deriver 106, using a Euclidean distance calculated on the basis of a complex autoregression coefficient, a log-likelihood ratio distance, a complex power cepstrum distance, a complex power mel cepstrum distance, a dynamic time expansion/contraction method, a neural network, or the like and classifies an abnormal example and a normal example by performing clustering on the basis of a numerical value and dissimilarity. Using this clustering result, the estimator 109 estimates the presence or absence of an abnormality regardless of the threshold value and performs estimation of a type or a cause of the abnormality and the like. In the following description, a method in which the dissimilarity calculator 108 quantifies the trajectory shape will be described as (3-1) "method of quantifying a trajectory shape generated according to mode information." Likewise, a method in which the dissimilarity calculator 108 calculates dissimilarities of the quantified trajectory shape from quantified trajectory shapes in a plurality of normal examples and classifies an abnormal example and a normal example by performing clustering on the basis of the dissimilarities will be described as (3-2) "method of calculating dissimilarity based on quantification information of the trajectory shape and performing clustering based on dissimilarity."

For example, the estimator 109 uses (generates) a state transition matrix in which analysis results are integrated with reference to the correlation information 202 between sensors generated in advance, the reference information 206 or the like storing information to be referred to when an abnormality is determined such as a replacement history of part of a sensor, and the like and performs the detection of the abnormality, the estimation of the breakdown of the correlation between sensors, the determination of a cause of the abnormality, and the like. In the following description, a method in which the estimator 109 performs the estimation of a type or a cause of the abnormality based on the estimation of the presence or absence of the abnormality, the estimation of the breakdown of the correlation between the sensors, and the like using a state transition matrix in which analysis results are integrated will be described as (4) "method of performing detailed estimation by integrating calculation results of the dissimilarity calculator according to a state transition matrix."

Figure 3:
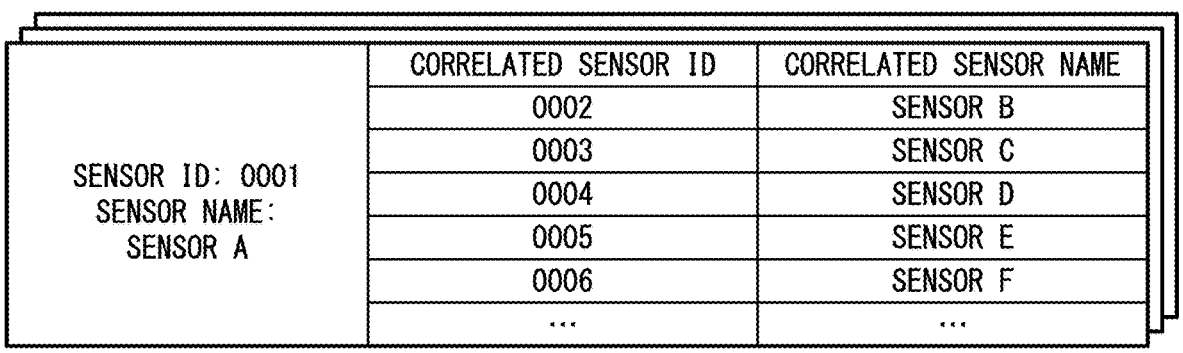
FIG. 3 is a diagram showing an example of content of correlation information 202.

FIG. 3 is a diagram showing an example of content of the correlation information 202. The correlation information 202 is information showing a correlation between sensors. The correlation information 202 is, for example, information generated in advance on the basis of a detection result (hereinafter referred to as normal data) of the sensor at the normal time. In FIG. 3, sensors correlated with each other are shown for each sensor. Sensors correlated with a detection result of a sensor having the sensor ID "0001" and the sensor name "sensor A" are sensors having sensor IDs "0002" to "0006" and sensor names "sensor B," "sensor C," "sensor D," and "sensor F." A sensor correlated with a certain sensor is a sensor for detecting a homogeneous detection target (for example, an "output voltage") that changes with a change in a detection target (for example, an "input voltage") of a certain sensor (for example, a "voltage senor") or a sensor (for example, a "current sensor") for detecting a heterogeneous detection target (for example, an "input current").

Even if one detection result changes with a change in the other detection result, a sensor estimated to have no correlation with the detection result due to an installation location or an installation environment may not be included in the correlation information 202. Also, the correlation information 202 may be information generated in advance, or may be information generated using a function of the abnormality detection device 1 according to a method to be described below. In this case, the abnormality detection device 1 may simultaneously detect the abnormality in parallel with the generation of the correlation information 202.

The estimator 109 estimates whether the sensor has an abnormal value with reference to the correlation information 202. For example, the estimator 109 estimates that a combination of "sensor A" and another sensor shows an abnormal value on the basis of the mode information acquired by the analyzer 104, the trajectory derived by the deriver 106, the dissimilarity calculated by the dissimilarity calculator 108, and the like and estimates that a correlation between sensor A and a sensor to be correlated has failed and "sensor A" is associated with a "sensor failure" when it is estimated that another combination of "sensor A" and a correlated sensor does not show an abnormal value. In other words, the estimator 109 estimates that "sensor A" is a sensor showing an abnormal value due to a sensor failure. On the other hand, the estimator 109 estimates a "system abnormality" when a correlation between "sensor A" and another sensor correlated with "sensor A" has not failed on the basis of the mode information acquired by the analyzer 104, the trajectory derived by the deriver 106, the dissimilarity calculated by the dissimilarity calculator 108, and the like. At this time, for example, it is possible to shorten a time period required for abnormality detection by performing a process of the analyzer 104, the deriver 106, the dissimilarity calculator 108, the estimator 109, or the like with only correlated sensors. Details of the process of the estimator 109 will be described below.

When the "system abnormality" has been estimated, the estimator 109 performs the identification of a sensor having an abnormal value and the estimation of a cause of an abnormality thereof using the reference information 206 in addition to the correlation information 202. Details of the above-described procedure of the estimator 109 will be described below.

Figure 4:
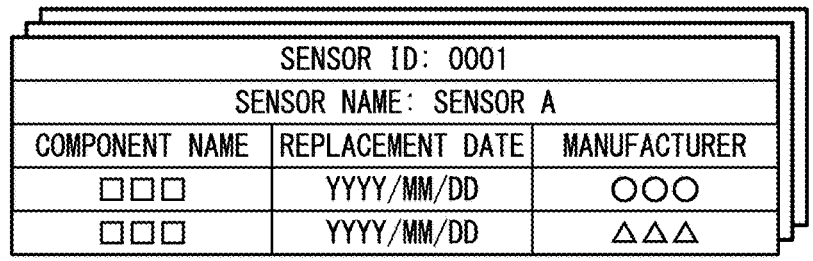
FIG. 4 is a diagram showing an example of content of reference information 206.

FIG. 4 is a diagram showing an example of content of the reference information 206. The reference information 206 is information in which a sensor ID for identifying a sensor, a sensor name, a name of a part constituting a device and a system near a measurement point of a sensor (for example, a pipe material constituting a pipeline when a sensor is a flowmeter installed in the pipeline or the like), a replacement date of the part, a name of a part constituting the sensor in addition to a maintenance history of a part near the sensor associated with a manufacturer for manufacturing (or selling) the part or the like, a sensor replacement date, information required to estimate a cause of abnormality detection associated with a sensor manufacturer, and the like are associated with each sensor. Also, content of the reference information 206 is an example and the present invention is not limited thereto and information considered to be useful described in the reference information 206 can be described.

Hereinafter, examples of the above-mentioned abnormality estimation process are divided into (1) "mode information acquisition method of extracting features of various abnormalities," (2) "method of visualizing mode information acquisition method using a trajectory shape," (3-1) "method of quantifying a trajectory shape generated according to mode information acquisition method," (3-2) "method of calculating dissimilarity based on quantification information of the trajectory shape and performing clustering based on dissimilarity," and (4) "method of performing detailed estimation by integrating calculation results of the dissimilarity calculator according to a state transition matrix" and their details will be described.

[Regarding (1) Mode Information Acquisition Method of Extracting Features of Various Abnormalities]

Content of the mode information acquisition process executed by the analyzer 104 will be described below. As described above, the analyzer 104 can reconstruct time-series information to multivariate data having time information of a near point as a variable by converting the time-series information of a single sensor acquired by the acquirer 102 into a set of vectors by applying, for example, the sliding window method. Thereby, the analyzer 104 can extract abnormalities in a plurality of modes as many as the number of window widths using a matrix decomposition method applied to the multivariate analysis. The analyzer 104 can also incorporate the lag structure in the mode information at the same time. At the same time, the process of incorporating the lag structure in the mode information is the above-described "first mode information acquisition process."

FIG. 5 is a diagram showing an example of the "first mode information acquisition process" of converting time-series information of a single sensor into a set of vectors using the sliding window method with a window width of 5, performing reconstruction to multivariate data, and performing a mode information acquisition process according to principal component analysis. It is possible to obtain mode information whose different features are extracted by executing multivariate analysis on data reconstructed by the analyzer 104 using a multivariate analysis method. Furthermore, when features of abnormalities having different properties in each mode are extracted from data reconstructed by the analyzer 104 and detection results of a plurality of sensors are collected and reconstructed to multivariate data in the above-described "second mode information acquisition process," it is possible to recover a lost time correlation according to the execution of the multivariate analysis using the multivariate data obtained through the reconstruction with the ignorance of a time correlation by employing information on which the "first mode information acquisition process" has been performed.

As described above, the analyzer 104 converts univariate data obtained from the detection result of the single sensor into multivariate data by introducing, for example, a lag structure in the "first mode information acquisition process" and applies a multivariate analysis method such as a principal component analysis method, a kernel principal component analysis method, a fuzzy principal component analysis method, a sparse principal component analysis method, a probabilistic principal component analysis method, or a robust principal component analysis method thereto. Thereby, the analyzer 104 acquires a plurality of mode information elements. When the sliding window method has been used as described in the above example in the "first mode information acquisition process," the analyzer 104 can acquire a plurality of mode information elements by a window width size m (m is a natural number). Because features of different abnormalities are extracted from a plurality of mode information elements, the abnormality detection device 1 can detect the abnormality without overlooking any abnormality by performing the abnormality detection using the plurality of mode information elements.

Figure 6:
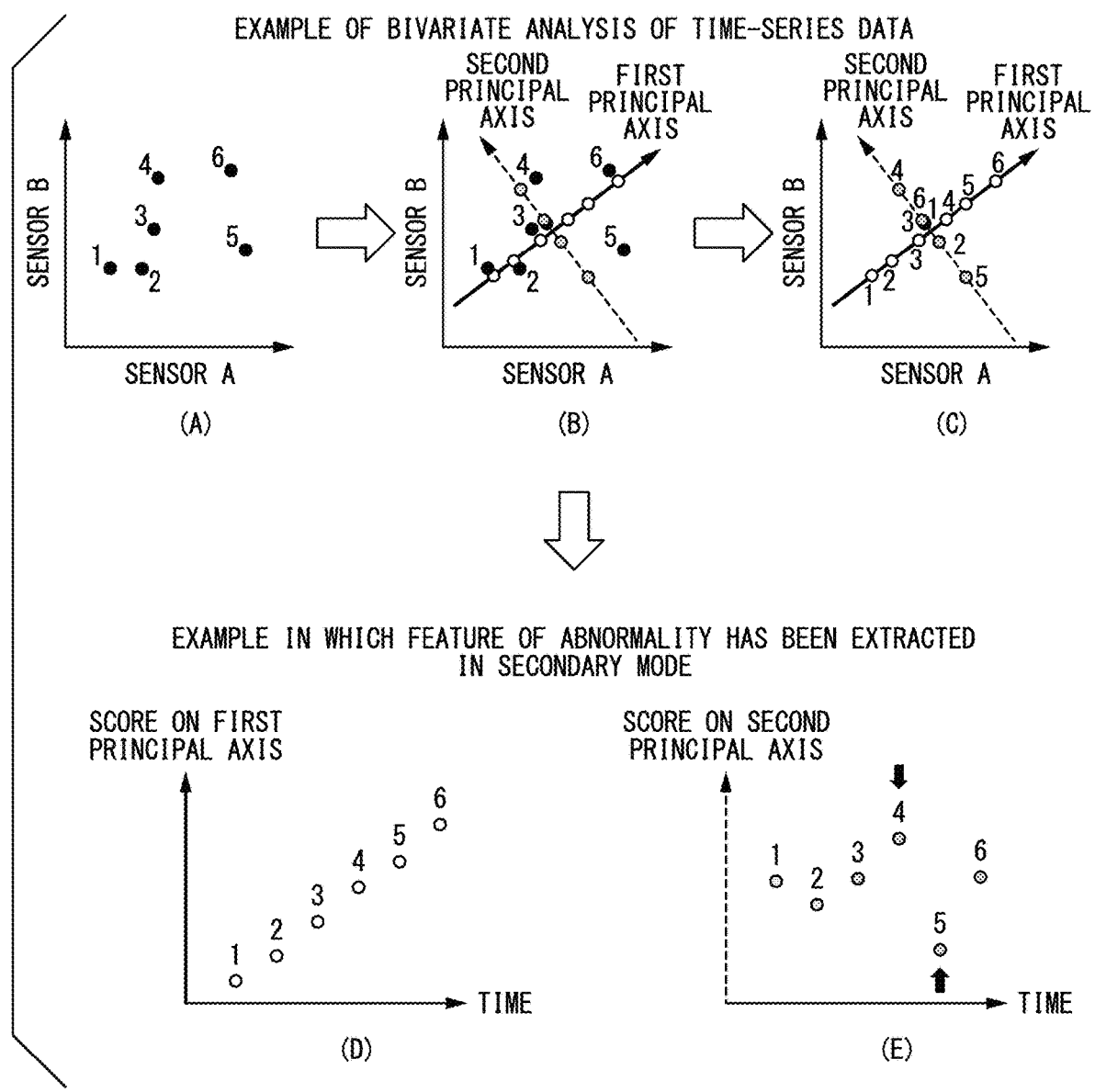
"
FIG. 6 is a diagram showing an example of a "second mode information acquisition process.

FIG. 6 is a diagram showing an example of the "second mode information acquisition process." In the "second mode information acquisition process," the analyzer 104 performs conversion into a set of vectors having detection results of two or more sensors at the same time as elements and performs reconstruction to an independent data set, so that the extraction of features of a plurality of modes is performed using multivariate analysis as descried above. FIGS. 6(A) to 6(C) are three graphs showing an example of a phase plane created with a detection result before the mode information acquisition process referred to as $0^{th}$-order mode information within "sensor A" and "sensor B." As shown in FIGS. 6(A) to 6(C), the abnormality is not clear in the $0^{th}$-order mode information. FIGS. 6(D) and 6(E) are graphs showing scores on a first principal axis and a second principal axis (hereinafter referred to as primary mode information and secondary mode information, respectively) extracted according to the "second mode information acquisition process" using the principal component analysis. As shown in FIGS. 6(D) and 6(E), it can be seen that features of abnormalities are extracted on the second principal axis (the secondary mode). Likewise, in the "first mode information acquisition process," it is possible to extract features of different abnormalities in accordance with an acquired mode. In the "second mode information acquisition process," for example, it is possible to extract features of a plurality of modes in which features of different abnormalities are acquired as many as the number of sensor s (s is a natural number) when s sensors are included in one data set.

It is possible to investigate in advance which mode information is suitable for detecting an abnormality among the plurality of mode information elements acquired by the analyzer 104 using sensor information of a target device or system. For example, for an abnormality in which the threshold value is set, a $0^{th}$-order mode is a mode suitable for detecting the abnormality. Also, for an abnormality in which an absolute value changes significantly, the primary mode is a mode suitable for detecting the abnormality. For an abnormality with a large local change, the secondary mode is a mode suitable for detecting the abnormality. Also, because the correlation between the sensors is reflected in the "second mode information acquisition process" which is performed by the analyzer 104, it is possible to detect an abnormality that cannot be extracted in the "first mode information acquisition process" of acquiring mode information for each sensor. If a mode and an extraction method to be used are selected in advance in accordance with properties of the abnormality on the basis of features of the mode information and the extraction method, the abnormality detection device 1 can quickly perform a process such as abnormality detection or estimation of a sign of an abnormality according to the purpose without performing exhaustive analysis.

The reference information 206 may include information representing a mode suitable for detecting each abnormality and the analyzer 104 may be configured to analyze a mode suitable for the time when each abnormality is detected with reference to the information. By performing feature extraction in a plurality of modes as described above, the abnormality detection device 1 can detect various abnormalities (not only an abnormality for which no threshold value is set but also an abnormality for which it is difficult to set a threshold value such as incorporation of irregular noise) without overlooking any abnormality.

Although the multivariate data used by the analyzer 104 in the "second mode information acquisition process" may be obtained by collecting a plurality of detection results ($0^{th}$-order mode information elements) acquired by the acquirer 102 and performing reconstruction to multivariate data as described above, a primary or higher-order mode information elements on which the "first mode information acquisition process" has been performed may be collected and reconstructed to multivariate data. Because a lag structure is introduced in the data on which the "first mode information acquisition process" has been performed by the analyzer 104, there is an advantage in that the analyzer 104 can recover a lost time correlation when multivariate analysis in which independence between data elements is assumed in the "second mode information acquisition process" is performed by performing the "second mode information acquisition process" using information on which the "first mode information acquisition process" has been performed.

The analyzer 104 may unify the mode types of all the sensors to be combined when reconstruction to the multivariate data is performed using the mode information on which the "first mode information acquisition process" has been performed (for example, all primary modes) or may use "first mode information acquisition process" information in any method such as a method of including $0^{th}$-order mode information for each sensor, changing a mode, and performing reconstruction to multivariate data.

[Regrading (2) Method of Visualizing Mode Information Using Trajectory Shape]

Hereinafter, content of a process in which the deriver 106 visualizes the mode information acquisition information according to the mode information visualization method using the trajectory shape will be described. Because the phase plane method has an effect of enlarging even a slight change that it is difficult to distinguish with a normal plot in which the horizontal axis represents time and the vertical axis represents a measured value on the phase plane, the phase plane method is known as a method of visualizing a change in a state with high sensitivity. The deriver 106 can generate a trajectory based on a time-series plot in which the horizontal axis represents time and the vertical axis represents a principal component score as shown in FIGS. 6(D) and 6(E) as well as a trajectory using the phase plane method. It is also possible to detect an abnormality through the dissimilarity calculator 108 and the estimator 109 by applying a detection procedure for use in the trajectory using the phase plane method with the trajectory based on the time-series plot.

Although a case in which the abnormality is visualized as trajectory information on a two-dimensional plane according to the phase plane method using the result of the "first mode information acquisition process" as a visualization target will be described below, the phase plane which is generated by the deriver 106 is not limited to two dimensions. Although it is difficult to visually recognize an abnormality in a high dimension, it is possible to generate a trajectory in a phase plane space of three or more dimensions and detect an abnormality by applying a process which is executed on the trajectory on a two-dimensional plane. When the deriver 106 visualizes the result of the "first mode information acquisition process" using the phase plane method, there are two methods such as a "first type univariate phase plane trajectory generation process" and a "first type multivariate phase trajectory generation process." Details of the above processes will be described below. When the visualized result is finally confirmed by humans, it is often easier to evaluate the result by treating it in a two-dimensional plane, but the deriver 106 may generate a phase plane trajectory of a high dimension whose visualization is difficult and perform a subsequent process.

In the deriver 106, the target for generating the phase plane trajectory is not limited to the result of the "first mode information acquisition process." For example, the phase plane trajectory including the $0^{th}$-order mode information before the mode information is acquired can be generated. The deriver 106 can include $0^{th}$-order mode information in m mode information elements and use the $0^{th}$-order mode information for trajectory generation when a result of performing the "first mode information acquisition process" of a window width m has been used and include $0^{th}$-order mode information in s modes and use the $0^{th}$-order mode information for trajectory generation when a result of performing the "second mode information acquisition process" by combining detection results of s sensors has been used.

Hereinafter, details of a method in which the deriver 106 generates a two-dimensional phase plane using the result of the "first mode information acquisition process" will be described. For example, the deriver 106 generates a two-dimensional phase plane according to a method of plotting information related to a detection result of the same sensor on both axes so that the horizontal axis represents primary mode information of "sensor A" (a score on the first principal component axis) and the vertical axis represents secondary mode information of "sensor A" (a score on the second principal component axis) with respect to a single sensor "sensor A." In the following description, the above generation method will be described as a "first type univariate phase plane trajectory generation process."

The above-described combination of plot targets is an example and the present invention is not limited thereto. For example, it is possible to plot the horizontal axis representing secondary mode information of "sensor A" and the vertical axis representing tertiary mode information of "sensor A" (a score on the third principal component axis). The combination can be a combination of modes in which abnormalities can be detected with higher accuracy. For example, when abnormalities often appear in the primary mode and the tertiary mode, the features of the abnormalities can be effectively visualized by adopting a plot in combination as in a plot in which the horizontal axis represents the primary mode and the vertical axis represents the tertiary mode. Because the appropriate mode for estimating the abnormality differs according to properties of the abnormality (a change in periodicity, incorporation of irregular noise, a change in a measured value, and the like), the deriver 106 generates a phase plane trajectory in a plurality of modes and the estimator 109 estimates whether or not an abnormality is observed using an obtained index (for example, dissimilarity) through a process to be described below using the generated phase plane trajectory. Although the modes are exhaustively combined to generate a phase plane when the properties of the abnormality are unknown, the deriver 106 generates a phase plane in an appropriate mode according to the properties of the abnormality when the properties of the abnormality desired to be detected are determined. For example, when an arrhythmia is desired to be detected in an electrocardiogram, the deriver 106 generates a phase plane in a mode optimal for detecting an abnormality in accordance with a type of arrhythmia. Therefore, when the properties of the abnormality desired to be detected are determined in advance, the deriver 106 can shorten a time period required for abnormality detection by limiting the mode information for use in the generated trajectory to a specific one.

Although the deriver 106 detects an abnormality according to a change in a plurality of sensors in the "first type multivariate phase plane trajectory generation process" to be described in detail below, the deriver 106 is not limited thereto and may use identical mode information including $0^{th}$-order mode information on all axes on the basis of a change in a single sensor in "first type multivariate phase plane trajectory generation process" and generates a phase plane trajectory by combining appropriate mode information. By limiting the trajectory generation to the mode suitable for the characteristic of the abnormality, the deriver 106 shortens a time period required for detecting the abnormality.

When the result of the "first mode information acquisition process" is used, the deriver 106 can generate a two-dimensional phase plane by plotting information obtained from different sensors instead of plotting information obtained from the same sensor on both axes. In the following description, the above generation method will be described as a "first type multivariate phase plane trajectory generation process." The deriver 106 can perform effective abnormality detection by selecting a combination of modes for the plot in accordance with the properties of the abnormality in the "first type multivariate phase plane trajectory generation process" as in the "first type univariate phase plane trajectory generation process." In the "first type multivariate phase plane trajectory generation process," it is possible to detect an abnormality for which a threshold value is not set and estimate the cause of the abnormality by detecting an abnormality based on a change between a plurality of sensors. Next, a case in which the deriver 106 performs the "first type multivariate phase plane trajectory generation process" will be described in detail.

In the deriver 106, for example, a method of generating the phase plane according to the "first type multivariate phase plane trajectory generation process" is as follows. In the following description, for convenience of description, an example in which the deriver 106 generates a phase plane trajectory by combining primary mode information of "sensor A" and primary mode information of "sensor B" will be described. For example, the deriver 106 generates a plotted phase plane in which the horizontal axis represents the primary mode information of "sensor A" acquired according to the "first mode information acquisition process" in the analyzer 104 and the vertical axis represents the primary mode information of "sensor B."

The deriver 106 can also generate a phase plane using the $0^{th}$-order mode information before the mode information acquisition process. Also, as described above, the combination of mode information is not limited to the above. Because the mode in which the abnormality is extracted differs in accordance with properties of the abnormality, it is possible to more clearly represent a difference from the normal time by selecting an optimum combination of mode information including the $0^{th}$-order mode information when the phase plane trajectory is generated and efficiently perform the abnormality detection or the estimation of a type or a cause of an abnormality when the phase plane trajectory is generated.

Hereinafter, an example in which the deriver 106 performs the "first type multivariate phase plane trajectory generation process" using the primary mode information of "sensor A" and the primary mode information of "sensor B" extracted in the "first mode information acquisition process" is shown. The deriver 106 can exhaustively use all sensor combinations as trajectory derivation targets, use only a sensor group selected in advance using the correlation information 202 as a trajectory derivation target in accordance with the purpose of abnormality detection, limit a target sensor combination to use the target sensor combination as a trajectory derivation target. If the deriver 106 generates a trajectory for a group of sensors having a positive correlation, the abnormality on the phase plane trajectory can be enlarged and expressed and the detection of an abnormality or the estimation of a type of abnormality can be performed easily. If the deriver 106 generates a trajectory for a group of sensors having a negative correlation, the abnormality can be enlarged and expressed and the detection of an abnormality or the estimation of a type of abnormality can be performed easily by devising a plot such as reversing one of the positive and negative signs. Also, in the following description, a case in which the combination of the primary mode information of "sensor A" and the primary mode information of "sensor B" among all the combinations is used as the trajectory derivation target will be described as an example. Also, in the following description, the primary mode information of "sensor A" selected as a target of the "first type multivariate phase plane trajectory generation process" will be described as a mode-1 result x and the primary mode information of "sensor B" will be described will be described as a mode-1 result y.

Figure 8:
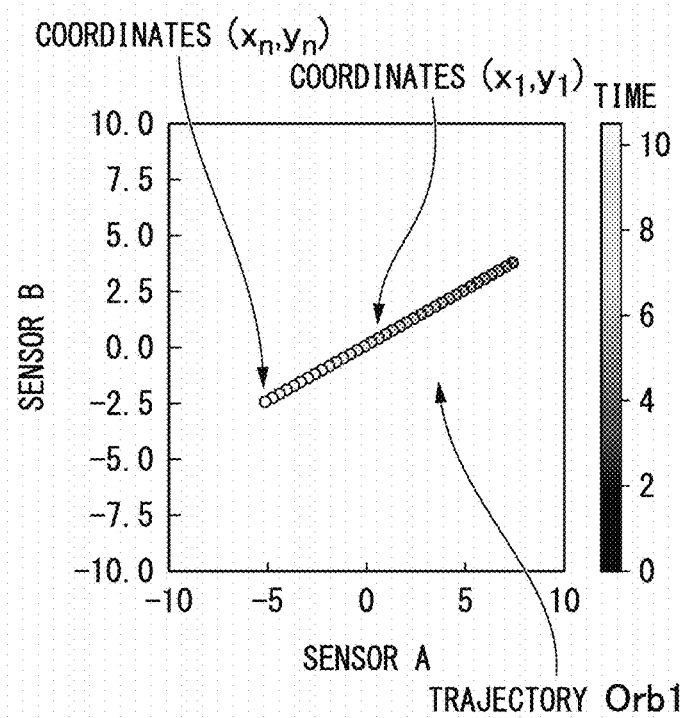
FIG. 8 is a diagram showing an example of a shape of a trajectory on a phase plane in the normal state.

The deriver 106 plots coordinates (coordinates $(x_1, y_1), \ldots,$ coordinates $(x_n, y_n)$ shown in FIG. 8) (n is a natural number) representing elements whose detection timings match among elements $\{x_1, x_2, \ldots, x_n\}$ included in the mode-1 result x and elements $\{y_1, y_2, \ldots, y_n\}$ included in the mode-1 result y on a phase plane in which a first axis (for example, a horizontal axis) represents the mode-1 result x and a second axis (for example, a vertical axis) represents the mode-1 result y and generates a trajectory by connecting the coordinates with a straight line in time-series order.

Figure 7:
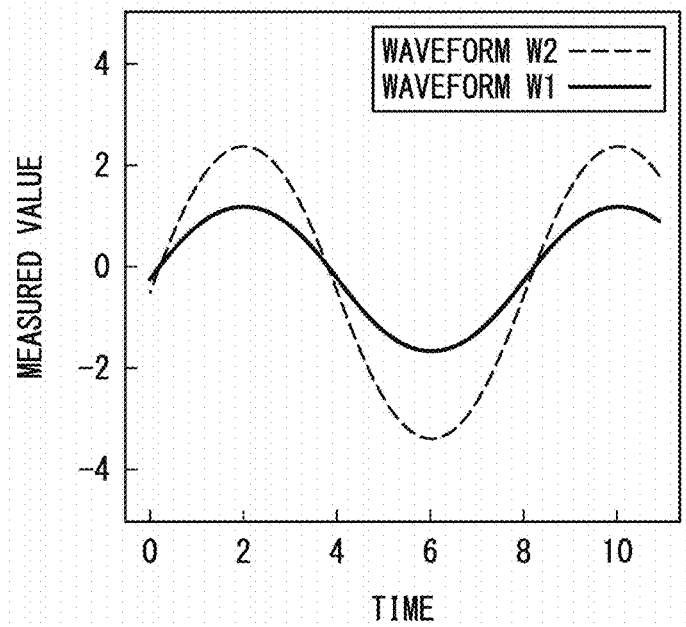
"
FIG. 7 is a graph showing an example of a change over time in a measured value of a sensor in a normal state.

FIG. 7 is a graph showing an example of a change over time in the sensor in a normal state. A waveform W2 shown in FIG. 7 is a waveform representing a change over time in a detection result of "sensor A" and a waveform W1 is a waveform representing a change over time in a detection result of "sensor B."

FIG. 8 is a diagram showing an example of a shape of a trajectory on the phase plane in the normal state. The deriver 106 generates a trajectory (a trajectory Orb1 shown in FIG. 8) obtained by connecting coordinates (coordinates $(x_1, y_1), \ldots,$ coordinates $(x_m, y_m)$ shown in FIG. 8) representing the elements of the mode-1 result x and the elements of the mode-1 result y with a straight line in time-series order on a phase plane in which the horizontal axis represents the mode-1 result x derived on the basis of the detection result of "sensor A" of a waveform W2 and the vertical axis represents the mode-1 result y derived on the basis of the detection result of "sensor B" of a waveform W1.

Although an example in which the deriver 106 uses the primary mode information when the trajectory is derived has been described above, the vertical axis and the horizontal axis of the phase plane trajectory are not limited to the above combination. As described above, the mode information used by the analyzer 104 freely combined from the $0^{th}$-order mode information to the available higher-order mode information can be selected on the vertical axis and the horizontal axis.

The estimator 109 estimates whether or not an abnormal value has been detected on the basis of dissimilarity between the shape of the trajectory derived by the deriver 106 and the trajectory shape information 204, which is information representing the shape of the trajectory in the normal state. For example, in the trajectory shape information 204 in which the trajectory shape information in the normal state is stored, as in the detection result information 300, all sensor information acquired from a certain time to a certain time is set as an example, an example number is assigned for each acquisition example, and a result of the "first type multivariate phase plane trajectory generation process" at the normal time is recorded together with acquisition time information and the like. The information includes, for example, information representing the shape of the trajectory derived in a plurality of modes including the $0^{th}$-order mode on the basis of the detection results of "sensor A" and "sensor B" in the normal state. Specifically, the trajectory shape information 204 includes information representing the shape of the trajectory related to the combination of "sensor A" and "sensor B" as shown in FIG. 8. When the phase plane trajectory shape of FIG. 8 is set as a phase plane trajectory shape in the normal state derived using the primary mode information of "sensor A" and "sensor B" of Example No. 1, the trajectory shape information 204 stores phase plane trajectory information for a plurality of examples including Example Nos. 1 to k (k is a natural number). The estimator 109 can detect an abnormality for which no threshold value is set on the basis of a result of investigating whether or not a trajectory shape of an inspection target is classified into the normal state by clustering a plurality of trajectory shapes in the normal state and the trajectory shape of the inspection target on the basis of similarity in the dissimilarity calculator 108. This is because if the abnormality is not similar to any one of the plurality of normal examples, it can be determined that the abnormality belongs to a classification different from the normal examples. Here, although the serial number example is described as an example, an example adopted as a normal example does not need to have a serial number and an appropriate one can be freely selected from the past normal examples. Hereinafter, a case in which the normal example of a serial number is selected will be described.

Figure 10:
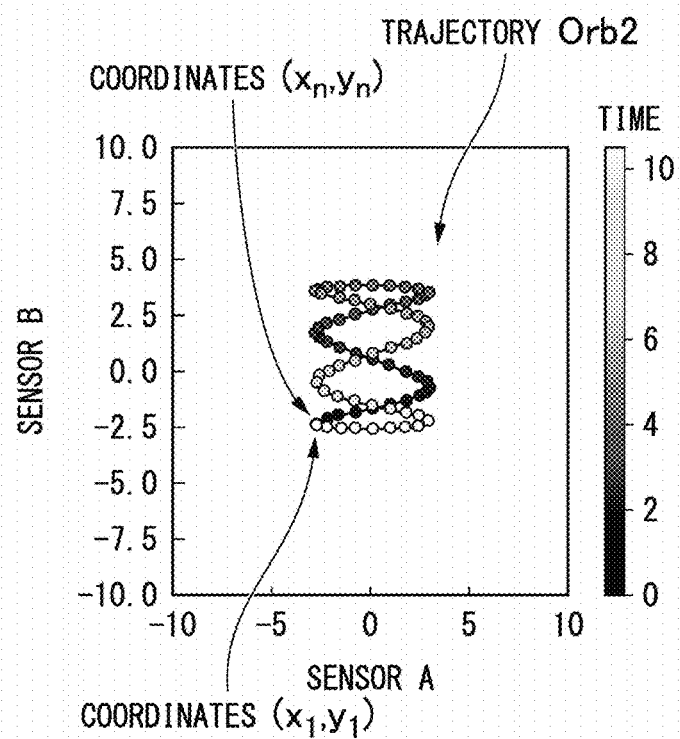
FIG. 10 is a diagram showing an example of a shape of a trajectory on a phase plane in the abnormal state.

Although details of the dissimilarity calculation method and the clustering method in the dissimilarity calculator 108 will be described below, for example, the estimator 109 estimates whether or not the sensor has measured an abnormal value by extracting a shape of a trajectory corresponding to a combination of sensors of interest (for example, "sensor A" and "sensor B") from shapes of trajectories in normal examples of Example Nos. 1 to k stored in the trajectory shape information 204 and makes a comparison with dissimilarity between the extracted trajectory shape and the phase plane trajectory shape formed by a pair of sensors corresponding to a pair of sensors of interest among normal examples of Example Nos. 1 to k. In this way, there is an advantage in that the abnormality detection device 1 can extract a feature of an abnormality as shown in FIG. 6(E) and further enlarge and detect a feature of a change on a phase plane trajectory as shown in FIG. 10 as compared with a case in which an abnormality is analyzed using a general time-series graph as shown in FIG. 7 with use of both the abnormality extraction according to the "mode information acquisition process" and the "phase plane method." Furthermore, when the two sensors have a positive correlation, the deriver 106 can derive a phase plane trajectory whose change is enlarged and visualized as compared with a general time-series graph and provide information (i.e., a trajectory shape) for enabling even a slight sign of an abnormality to be detected without overlooking the slight sign. The estimator 109 estimates that "sensor A" and "sensor B" of the inspection target do not show an abnormal value when dissimilarity is low even if the phase plane trajectory shape of a pair of sensors of interest is compared with any phase plane trajectory shape corresponding to Example Nos. 1 to k formed by "sensor A" and "sensor B" of the normal time (i.e., when they are significantly similar) and estimates that "sensor A" and "sensor B" of the inspection target show an abnormal value when dissimilarity is high (the shapes are different). By making a comparison with a plurality of normal examples, the estimator 109 can classify the normal examples and the abnormal examples according to dissimilarity without presetting a threshold value. Details of the dissimilarity classification method will be described below.

Although the estimation of dissimilarity can be qualitatively determined by the observer, a method of quantifying a trajectory shape, automating a determination, and reporting a result will be described here. Also, the low dissimilarity between the shapes of the trajectories includes a case in which a deviation in the trajectory is within a predetermined range and a case in which the observer regards the shapes as the same shape as well as a case in which the shapes are exactly the same. Details of the dissimilarity estimation method will be described below.

Figure 9:
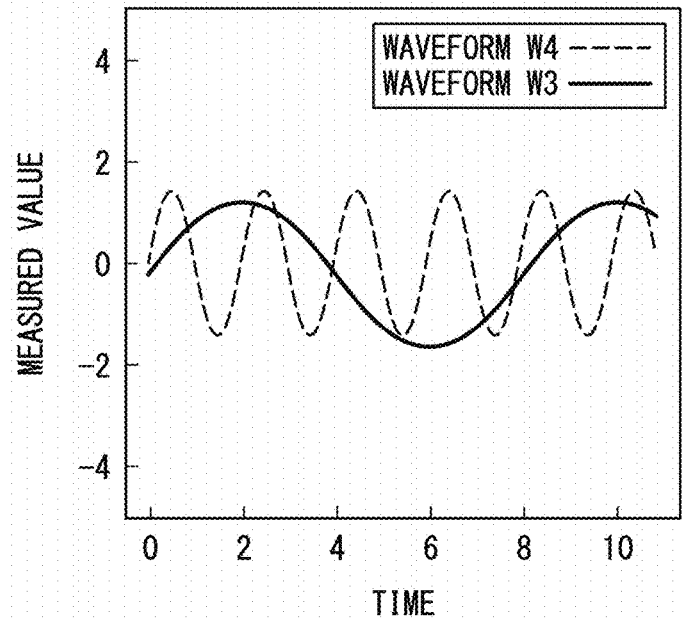
FIG. 9 is a graph showing an example of a change over time in a measured value of a sensor in an abnormal state.

FIG. 9 is a diagram showing an example of a change over time in the sensor in an abnormal state. A waveform W4 shown in FIG. 9 is a waveform showing a change over time in a detection result of "sensor A" and a waveform 3 is a waveform showing a change over time in a detection result of "sensor B." In the present example, it can be seen that "sensor A" is operating abnormally (i.e., sensor A is a specific sensor) and a cycle of a change is fast and an amplitude is also small as represented by the waveform W4.

FIG. 10 is a diagram showing an example of a shape of a trajectory on a phase plane in the abnormal state. The deriver 106 generates a trajectory (a trajectory Orb2 shown in FIG. 10) obtained by connecting coordinates (coordinates $(x_1, y_1), \ldots$, coordinates $(x_n, y_n)$ shown in FIG. 9) representing the elements of the mode-1 result x and the elements of the mode-1 result y with a straight line in time-series order on a phase plane in which the horizontal axis represents the mode-1 result x derived on the basis of the detection result of "sensor A" of the waveform W4 shown in FIG. 9 and the vertical axis represents the mode-1 result y derived on the basis of the detection result of "sensor B" of the waveform W3.

The shape of the trajectory Orb2 shown in FIG. 10 is different from the shape of the trajectory Orb1 of FIG. 8. When a comparison with phase plane trajectory shapes of "sensor A" and "sensor B" of a plurality of other normal examples stored in the trajectory shape information 204 is made, the estimator 109 can estimate that one or both of "sensor A" and "sensor B" related to the trajectory Orb2 show an abnormal value when there is no similarity associated with any normal example. As described above, it is possible to detect abnormalities regardless of a threshold value by making a comparison with a plurality of normal examples and making an exhaustive determination. The estimator 109 quantifies the phase plane trajectory shape through the dissimilarity calculator 108 and estimates whether or not there is an abnormality from a clustering result on the basis of similarity associated with a numerical value obtained from the phase plane trajectory shapes of a plurality of past normal examples.

The estimator 109 can detect an abnormality even if the estimation of whether or not there is an abnormality in analysis of a time-series change of a single sensor is difficult because no threshold value is set, because it is difficult to set a threshold value, or the like by comparing results of multivariate analysis (analysis based on changes in "sensor A" and "sensor B" in the present case) using the phase plane trajectories of the plurality of modes with a plurality of normal data elements and estimating whether or not there is an abnormality. Furthermore, because the mode information acquisition enables a large change due to an abnormality to be extracted and can further enlarge and visualize the change through the phase plane, the estimator 109 can detect even a slight sign of an abnormality without overlooking the slight sign. The deriver 106 can provide a detailed analysis material that enables not only abnormality detection but also failure prediction according to analysis using the phase plane trajectories of a plurality of modes.

Although the estimator 109 can perform an exhaustive search on the mode information used for estimating the abnormality by combining information from the $0^{th}$-order mode information to the available higher-order mode information as in the method of handling the mode information in the analyzer 104 and the deriver 106, it is possible to pre-investigate an optimum mode according to properties of an abnormality desired to be detected and execute the above-described processes on only mode information obtained in a specific mode using information thereof. Also, the estimator 109 can increase detection sensitivity by performing a standardization process of aligning the mean and the variance before a higher-order mode extraction process (or even after the mode information acquisition process if necessary) according to the properties of an abnormality.

Although a case in which the deriver 106 generates a phase plane trajectory on the basis of a result of the "first mode information acquisition process" has been described above, information used for generating the phase plane trajectory is not limited thereto. Because the mode in which the abnormality is extracted differs according to the properties of the abnormality, the deriver 106 generates a phase plane trajectory using the appropriate mode in accordance with the properties of the abnormality such as a change in periodicity and incorporation of irregular noise and the dissimilarity calculator 108 is required to calculate the dissimilarity on the basis of the trajectory generated by the deriver 106.

[Regarding (3-1) Method of Quantifying Trajectory Shape Generated According to Mode Information and (3-2) Method of Calculating Dissimilarity Based on Quantification Information of Trajectory Shape and Performing Clustering Based on Dissimilarity]

Hereinafter, as an example of the method of quantifying the trajectory shape generated according to the mode information acquisition information and the method of calculating the dissimilarity based on the quantification information of the trajectory shape and performing clustering based on the dissimilarity, content of a process of quantifying a phase plane trajectory shape according to a complex autoregression coefficient calculated by the dissimilarity calculator 108 and calculating dissimilarity using a numerical value of a phase plane trajectory shape of a normal time calculated from the trajectory shape information 204 storing the phase plane trajectory information of a normal time and a numerical value calculated from the phase plane trajectory generated using data of a detection target will be described. In the trajectory shape information 204, the result of pre-quantifying the trajectory shape in the method to be described below may be recorded together with the phase plane trajectory information and numerical information thereof may be read to calculate the dissimilarity. Thereby, a processing time period required for quantifying the phase plane trajectory shape can be shortened. As an example, the dissimilarity calculator 108 converts the shape of the trajectory derived by the deriver 106 into numerical information according to an image extraction method using a complex autoregression coefficient for each trajectory shape. In the following description, a method in which the dissimilarity calculator 108 calculates the dissimilarity associated with the normal state using a complex power cepstrum distance calculated from the complex autoregression coefficient will be described. The dissimilarity calculator 108 uses information obtained by quantifying the trajectory shape according to the complex autoregression coefficient to calculate a complex power cepstrum distance which is a difference (a distance) between two complex autoregression coefficients with information obtained by similarly quantifying a plurality of trajectory shapes in a normal state. Furthermore, the dissimilarity calculator 108 performs clustering on the basis of the calculated complex power cepstrum distance to classify the normal example and the abnormal example. The complex power cepstrum distance is associated with an example of "calculation of dissimilarity between phase plane trajectory shapes" and a method of "calculation of dissimilarity between phase plane trajectory shapes" is not limited to the above. The dissimilarity calculator 108 can calculate the dissimilarity using methods based on a Euclidean distance, a log-likelihood ratio distance, a complex power cepstrum distance, a complex power mel cepstrum distance, and the like.

Details of a method in which the dissimilarity calculator 108 extracts a shape of the trajectory from the phase plane trajectory derived by the deriver 106 when the phase plane trajectory shape is quantified are shown below in an example of the complex power cepstrum distance calculated on the basis of the complex autoregression coefficient. For example, the dissimilarity calculator 108 converts the trajectory shown on the phase plane derived by the deriver 106 into an image of a predetermined size (or a predetermined number of pixels) and extracts a shape of the trajectory (a contour line (an edge)) on the basis of the brightness of each pixel (a pixel value) when the image obtained through the conversion is a grayscale image. When the trajectory shape is quantified using the complex autoregression coefficient, the dissimilarity calculator 108 derives an $m^{th}$-order complex autoregression coefficient when a point sequence obtained by tracing the contour line of the extracted trajectory is represented by Eq. (1) and a complex expression thereof is represented by Eq. (2). As shown in Eq. (3), the $m^{th}$-order complex autoregression coefficient is defined as a model for approximating the contour points in a linear combination of the contour points before an $m^{th}$ contour point.

[Math. 1]

$$(x_j, y_j)(j=0,1,\ldots,N-1) \quad (1)$$

[Math. 2]

$$z_j = x_k + iy_j \quad (2)$$

[Math. 3]

$$z_j = \sum_{k=1}^{m} a_k z_{j-k} + \varepsilon_j \quad (3)$$

$\{a_k\}_{k=1}^{m}$: Complex autoregression coefficient

The dissimilarity calculator 108 extracts the trajectory shape information according to the above-described method for each phase plane trajectory generated by the deriver 106 and converts the extracted trajectory shape information into a complex autoregression coefficient. Furthermore, the dissimilarity calculator 108 derives a complex power cepstrum distance Dc(z1, z2) between a complex autoregression coefficient z1 of a trajectory obtained through conversion and a complex autoregression coefficient z2 of a trajectory of the normal time which is a complex autoregression coefficient derived from a plurality of corresponding phase plane trajectory information elements of the normal time stored in the trajectory shape information 204 in a procedure similar to the above. The complex power cepstrum distance Dc(z1, z2) is represented by Eq. (4) as a mean square distance between logarithms of spectral envelopes of the complex autoregression coefficient z1 and the complex autoregression coefficient z2. Also, when the trajectory shown in the trajectory shape information 204 is converted into a complex autoregression coefficient in advance, the dissimilarity calculator 108 calculates the complex power cepstrum distance Dc using the converted information.

[Math. 4]

$$Dc(z1, z2) = \left| \frac{g_0^{(1)}}{(r_0^{(1)}/N)} - \frac{g_0^{(2)}}{(r_0^{(2)}/N)} \right| + 2\sum_{j=1}^{N-1} |g_j^{(1)} - g_j^{(2)}|^2 \quad (4)$$

$\{g_j^{(1)}\}_{j=1}^{N-1}$: Complex power cepstrum coefficient of complex autoregressive model z1
$\{g_j^{(2)}\}_{j=1}^{N-1}$: Complex power cepstrum coefficient of complex autoregressive model z2

The complex power cepstrum distance is calculated by exhaustively combining complex autoregression coefficients two by two among a complex autoregression coefficient of a detection target and a plurality of complex autoregression coefficients of the normal time. For example, when the number of phase plane trajectory information elements of the normal time formed by "sensor A" and "sensor B" is a total of 18 in Example Nos. 1 to 18, the dissimilarity calculator 108 extracts complex autoregression coefficients two by two from a total of 19 complex autoregression coefficients including complex autoregression coefficients z1 to z18 derived from the phase plane trajectory shape of a normal time and a complex autoregression coefficient z19 based on a phase plane trajectory formed by "sensor A" and "sensor B" of the inspection target acquired by the acquirer 102 and calculates a complex power cepstrum distance Dc between the extracted complex autoregression coefficients.

Figure 11:
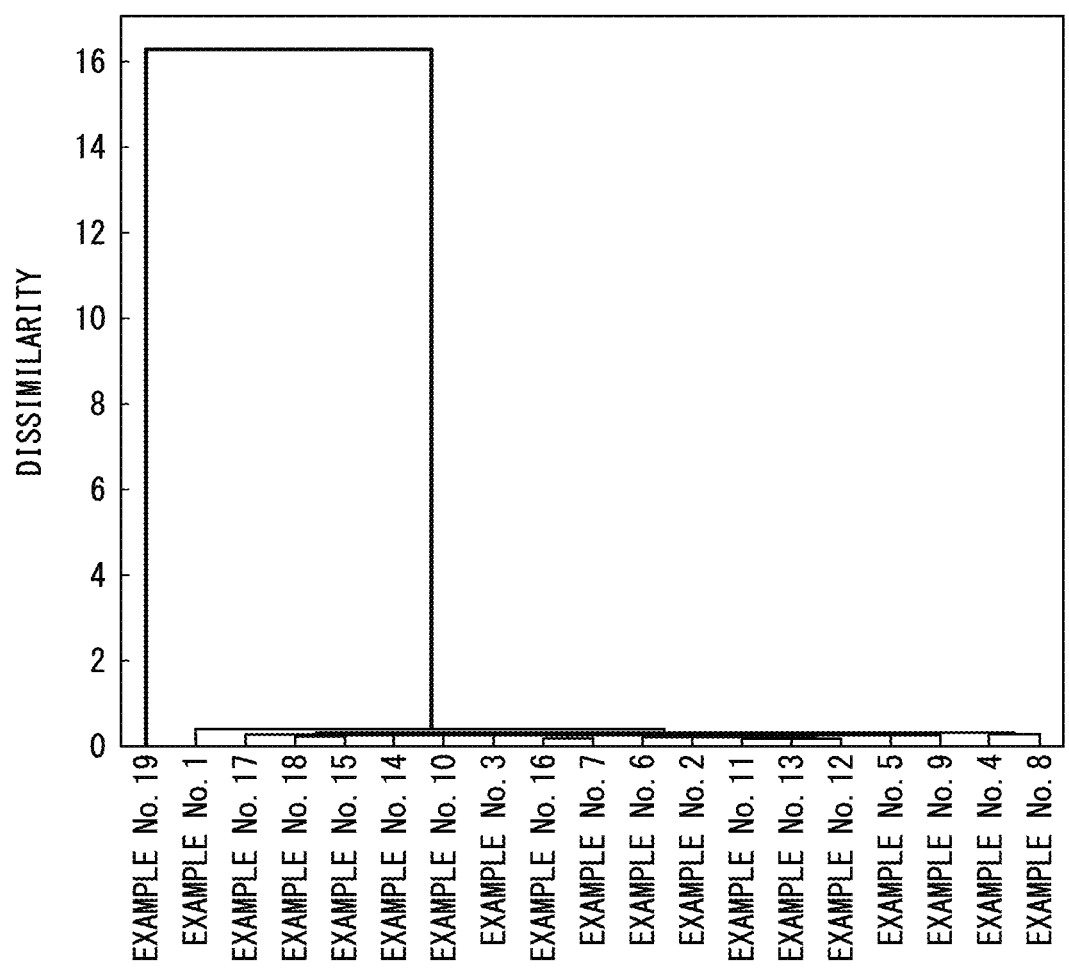
FIG. 11 is a diagram (a dendrogram) showing an example of a complex power cepstrum distance Dc classified by a dissimilarity calculator 108.

The dissimilarity calculator 108 classifies the complex power cepstrum distance Dc into an abnormal example and a normal example according to hierarchical clustering. FIG. 11 is a diagram showing an example of the complex power cepstrum distance Dc classified by the dissimilarity calculator 108. FIG. 11 is a diagram called a dendrogram showing a result of clustering all Examples 1 to 19 including the detection target on the basis of the complex power cepstrum distance Dc calculated by the dissimilarity calculator 108. In FIG. 11, the complex power cepstrum distance Dc is represented by a length of a branch of a tree diagram. In general, the difference between the two complex autoregression coefficients increases (i.e., the dissimilarity increases) as the value of the complex power cepstrum distance Dc increases and the difference between the two complex autoregression coefficients decreases (i.e., the trajectories are similar with low dissimilarity) as the value of the complex power cepstrum distance decreases. For example, in the example shown in FIG. 11, because the complex power cepstrum distance Dc related to "Example No. 19" is larger when a comparison is made with the complex autoregression coefficient of the phase plane trajectory shape named "Example No. 19" and the complex autoregression coefficients of normal examples of Example Nos. 1 to 18 calculated through the analyzer 104, the deriver 106, and the dissimilarity calculator 108 on the basis of the information obtained from the acquirer 102, the estimator 109 can determine that "Example No. 19 (detection target)" has high dissimilarity in association with the normal time and is classified into a group separate from that of the normal time and can estimate one or both of two sensors among combinations of "sensor A" and "sensor B" for "Example No. 19" as specific sensors showing abnormal values.

In the above description, the dissimilarity calculator 108 may be configured to calculate the Euclidean distance, the log-likelihood ratio distance, the complex power cepstrum distance, or the complex power mel cepstrum distance on the basis of the complex autoregression coefficient obtained by converting the shape of the trajectory into a numerical value. The Euclidean distance, the log-likelihood ratio distance, the complex power cepstrum distance, and the complex power mel cepstrum distance are examples of the "difference between complex autoregression coefficients."

As described above, a model used by the dissimilarity calculator 108 for quantifying the shape of the trajectory is not limited to a method using the complex autoregression coefficient. Also, a dissimilarity calculation method is not limited to the above. Because the method using the complex autoregression coefficient is a method of extracting only an outer shape of the figure, for example, it is possible to use a method of a neural network in which an internal shape can be extracted or the like in addition to a method of calculating dissimilarity of the phase plane trajectory shape such as a dynamic time expansion/contraction method in consideration of a lag structure when a more detailed determination is required. On the basis of the above result, the dissimilarity can be calculated as in a case in which the complex autoregression coefficient is used.

As described above, when a difference between a numerical value obtained from abnormality detection target data on the basis of a numerical value obtained by quantifying a trajectory shape calculated by the dissimilarity calculator 108 and a numerical value obtained from normal data (the complex power cepstrum distance Dc in the present example) is larger than any difference calculated between certain normal data and other normal data, the estimator 109 determines that dissimilarity between both sides is high when abnormality detection target data and a normal data group are clustered as separate groups as shown in FIG. 11 and estimates that one or both of the sensors related to the abnormality detection target data ("sensor A" and "sensor B" in the present example) are specific sensors showing abnormal values.

Because the mode information acquisition method enables an abnormality to be enlarged and extracted as shown in FIG. 6E, a slight change that it is difficult to distinguish in a normal plot in which the horizontal axis represents time and the vertical axis represents a measured value can be detected by plotting mode information acquisition information on a phase plane having the effect of enlarging a trajectory. Thereby, the estimator 109 can detect the occurrence of an abnormality at the predictive stage. In the present example, what the estimator 109 estimates as a specific sensor is a combination of sensors. When the deriver 106 has derived the trajectory of a single sensor, the estimator 109 can detect an abnormality of a single sensor instead of an abnormality in a combination of sensors in a similar method. A method of identifying a sensor showing an abnormal value when the estimator 109 estimates that the combination of sensors of the abnormality detection target data shows an abnormal value will be described below.

[Regarding (4) Method of Performing Detailed Estimation by Integrating Calculation Results of Dissimilarity Calculator According to State Transition Matrix]

Figure 12:
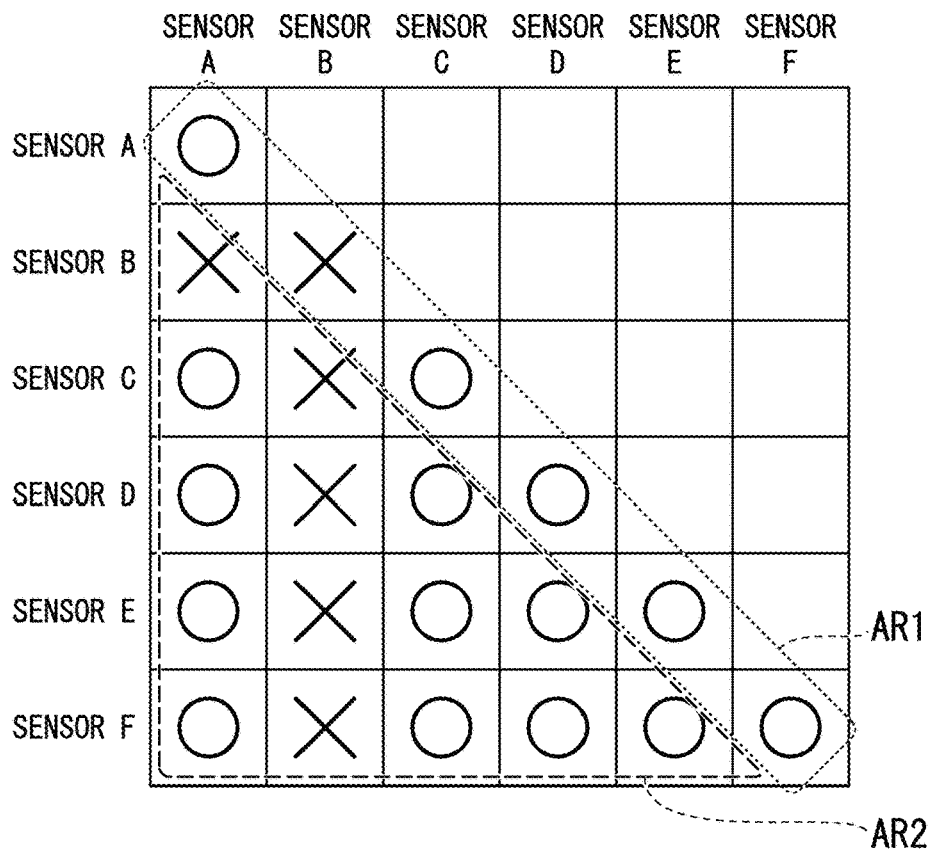
FIG. 12 is a diagram showing an example of a state transition matrix generated by an estimator 109.

Hereinafter, a method in which the estimator 109 integrates calculation results of the dissimilarity calculator 108 using a state transition matrix and identifies a sensor showing an abnormality and therefore determines whether an abnormality is a sensor abnormality or a system abnormality will be described. The estimator 109 can identify a sensor showing an abnormal value and perform detailed analysis such as the estimation of a type or a cause of an abnormality by generating a state transition matrix and arranging a result of estimating whether or not the combination of sensors of a detection target shows an abnormal value using a clustering result based on the dissimilarity. For example, as shown in FIG. 12, in the state transition matrix, the sensors are associated with each other as the vertical axis and the horizontal axis and the abnormality estimation result is written. A method of generating the state transition matrix will be described below.

FIG. 12 is a diagram showing an example of a state transition matrix generated by the estimator 109. Because the state transition matrix has the vertical symmetry across diagonal elements matching elements shown on the vertical axis and the horizontal axis and a combination of "sensor A" of the vertical axis and "sensor B" of the horizontal axis and a combination of "sensor B" of the vertical axis and "sensor A" of the horizontal axis are not distinguished in the present embodiment, it is only necessary to generate a lower half including diagonal elements as shown in FIG. 12. As shown in FIG. 12, in the estimator 109, elements (elements of "sensor A" of the vertical axis and "sensor A" of the horizontal axis (elements of an area AR1 shown in FIG. 12)) matching sensor names shown on the vertical axis and the horizontal axis among the elements of the state transition matrix are elements representing whether or not each sensor has measured an abnormal value. Hereinafter, the elements matching the same sensor name will be described as "sensor A-sensor A," . . . , "sensor F-sensor F" as "sensor name of the horizontal axis-sensor name of the vertical axis." When a threshold value is set, it can be easily determined whether or not an abnormal value has been measured according to the threshold value. For example, an element matching the same sensor name is marked with "o" when the sensor does not show an abnormal value exceeding the threshold value and a corresponding element is marked "x" when the sensor shows an abnormal value exceeding the threshold value. When it is not possible to estimate whether or not each sensor shows an abnormal value using the threshold value, it is estimated whether or not each sensor has measured an abnormal value using a multivariate analysis result focusing on a change between the two sensors in, for example, a method to be described below. In the following description, a case in which a state transition matrix related to six sensors from "sensor A" to "sensor F" is generated as shown in FIG. 12 is taken into account. It is assumed that the sensors having a correlation are only "sensor A" and "sensor B." Also, because the threshold value is not set here, it is difficult to estimate an abnormality only according to the behavior of a single sensor. Therefore, an example in which fields of elements whose sensor names shown on the vertical axis and the horizontal axis match ("sensor A-sensor A," . . . , "sensor F-sensor F") are blank will be described.

Because the estimator 109 identifies a sensor showing an abnormal value, fills the above blanks, and performs detailed analysis such as estimation of a type of abnormality such as a sensor failure or a system abnormality or a cause of the abnormality, it is possible to arrange content of estimation of the estimator 109 and information written to the state transition matrix from results obtained from procedures described in the above (1), (2), (3-1), and (3-2). For example, content of estimation of the presence or absence of an abnormality from a clustering result in the estimator 109 is written to elements whose sensor names shown on the vertical axis and the horizontal axis do not match (elements of an area AR2 shown in FIG. 12) among elements of the state transition matrix. Hereinafter, the elements whose sensor names do not match are described as "sensor name of the horizontal axis-sensor name of the vertical axis" such as "sensor A-sensor B," . . . , "sensor A-sensor F." The estimator 109 estimates that an abnormal value is not shown from a detection result of a pair of sensors and marks a corresponding element of the state transition matrix with "o" when dissimilarity between a phase plane trajectory shape generated by a pair of a sensor shown on the vertical axis and a sensor shown on the horizontal axis and a phase plane trajectory shape generated by a pair of sensors of a group of a phase plane trajectory of a normal time is low from a clustering result of the dissimilarity calculator 108 and both are clustered in the same group and estimates that a detection result of a pair of sensors shows an abnormal value and marks a corresponding element of the state transition matrix with "x" when dissimilarity associated with a group of a phase plane trajectory of a normal time is high and an abnormal example is classified into an example different from a group of a normal example.

The estimator 109 iterates the above-described process until blanks in the elements whose sensor names shown on the state transition matrix do not match are filled. Next, if there is an element of "x" in the state transition matrix, the sensor showing the abnormal value is identified, all blanks of parts of the elements where sensor names shown on the state transition matrix match are filled according to the following procedure, and the state transition matrix is completed. Here, a method of filling blanks of elements whose sensor names match when all elements of combinations of "sensor B" and other sensors among the elements whose sensor names do not match are marked with "x" (the elements are different from those of the normal time) and all elements of the other combinations are marked with "o" (the elements are the same as those of the normal time) will be described. At this time, it is assumed that all elements whose sensor names shown on the vertical axis and the horizontal axis match (fields from "sensor A-sensor A" to "sensor F-sensor F") are blank. Also, it is assumed that a sensor correlated with "sensor A" is investigated on the basis of the correlation information 202 and is only "sensor B" and sensors correlated with each other are known to be only a sensor pair of "sensor A" and "sensor B." At this time, because elements of combinations of "sensor A" known to be correlated with "sensor B" and sensors other than "sensor B" are not marked with "x," the estimator 109 determines that an abnormal value has not been detected on the basis of a correlation between sensors shown in the case of a system abnormality, concludes that "sensor B" itself is abnormal and the other sensors do not show the abnormal value, and estimates that "sensor B" has failed. On the basis of the above estimation, a field of "sensor B-sensor B" which are elements whose sensor names shown on the vertical axis and the horizontal axis match among the elements of the state transition matrix is marked with "x" and a field of "sensor A-sensor A" which are elements whose sensor names shown on the vertical axis and the horizontal axis match is marked with "o." Furthermore, because all combinations of five sensors (sensor A and sensors C to F) other than "sensor B" are marked with "o," it is estimated that sensors "sensor C" to "sensor F" also do not show abnormal values, elements from "sensor C-sensor C" to "sensor F-sensor F" are marked with "o," and the state transition matrix is completed. At this time, the field of "sensor B-sensor B" may be marked with a symbol (for example, "#") or the like different from "o" and "x" to distinguish a sensor failure from a system abnormality and indicate a sensor failure. On the basis of the above result of the state transition matrix, necessary maintenance such as sensor replacement or repair is performed in the case of the sensor failure. When no sensor has failed, blanks of elements whose sensor names match are filled according to the following procedure.

A case in which no sensor has failed will be described using the following example. As described above, a case in which a state transition matrix related to six sensors from "sensor A" to "sensor F" is generated is taken into account. As described above, it is assumed that there is a case in which no threshold value is set and it is difficult to detect an abnormality by the sensor alone and elements whose sensor names shown on the vertical axis and the horizontal axis match ("sensor A-sensor A" to "sensor F-sensor F") among the elements of the state transition matrix are blank. Also, as described above, it is assumed that a sensor correlated with "sensor A" is investigated on the basis of the correlation information 202 and is only "sensor B" and sensors correlated with each other are known to be only a pair of sensors "sensor A" and "sensor B." At this time, as described above, the estimator 109 writes results of processes (1) to (3) to the state transition matrix. Here, a case in which all elements of combinations of the four sensors (sensors C to F) other than "sensor A" and "sensor B" are marked with "o" and the other elements are marked with "x" will be described. In this case, because "sensor A" correlated with "sensor B" also shows an abnormal value, the failure of a causal relationship is not observed, it is estimated that a system abnormality has occurred around "sensor A" and "sensor B" correlated with each other, and fields of "sensor A-sensor A" and "sensor B-sensor B" of elements whose sensor names shown on the horizontal axis and the vertical axis among elements of the state transition matrix match are marked with "x." Furthermore, it is confirmed that all fields of combinations of four sensors (sensors C to F) other than "sensor A" and "sensor B" (for example, "sensor C-sensor D," "sensor C-sensor F," and the like) are marked with "o," elements of "sensor C-sensor C," "sensor D-sensor D," "sensor E-sensor E," and "sensor F-sensor F" of elements whose sensor names shown on the vertical and horizontal axes match among the elements of the state transition matrix are marked with "o," and the state transition matrix is completed. Next, the completed state transition matrix is used to estimate the cause of the abnormality and take measures against the abnormality. The method of estimating the cause of the abnormality using the state transition matrix will be described below with an example.

When a system abnormality has been estimated according to the above-described procedure, the cause of the abnormality can be estimated according to the method to be described below using the completed state transition matrix. In the above-described example, it is estimated that both "sensor A" and "sensor B" show abnormal values. At this time, if it is known from the correlation information 202 that "sensor A" is upstream of the causal relationship and "sensor B" is downstream of the causal relationship, it is estimated that "sensor B" changes due to the change of "sensor A," so that it is estimated that there is a cause around "sensor A."

According to the reference information 206, if the parts near "sensor A" have not been replaced for a long time and there is a maintenance history such as information indicating that the replacement time is approaching, it is estimated that the deterioration of the parts is more likely to be the cause and hence it can be determined that the parts should be inspected first on the basis of the result of abnormality detection. Likewise, when there are a plurality of sensors having a direct correlation or an indirect correlation, the cause of the abnormality can be estimated from the state transition matrix using the correlation information 202, the reference information 206, and the like.

As described above, even if it is difficult to set the threshold value and estimate the abnormality by the sensor alone according to the methods of the above-described (1) to (4), the estimation of a sensor showing an abnormal value, the estimation of a sensor failure or a system abnormality, and the estimation of a cause of an abnormality in the case of a system abnormality are possible.

[Processing Flow]

Figure 13:
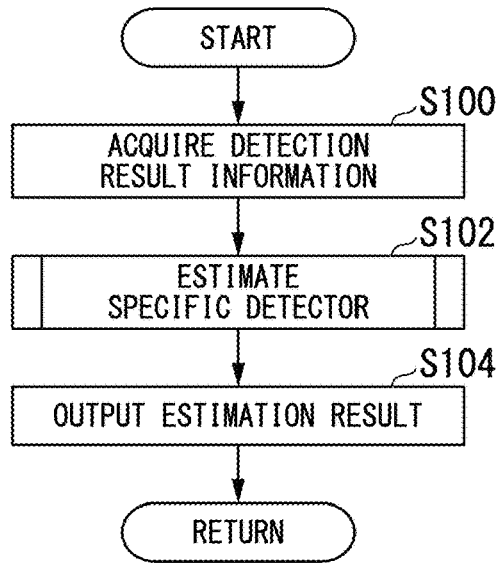
FIG. 13 is a flowchart showing a flow of a series of processing steps of a process of an abnormality detection device 1.

Details of the operation of the abnormality detection device 1 will be described below. FIG. 13 is a flowchart showing a flow of a series of processing steps of a process of the abnormality detection device 1. For example, the acquirer 102 acquires the detection result information 300 from log information of an abnormality detection target (step S100). Next, the estimator 109 estimates a specific sensor showing an abnormal value on the basis of a result of analyzing the detection result information 300 acquired by the acquirer 102 via the analyzer 104, the deriver 106, and the dissimilarity calculator 108 (step S102). Details of the processing of step S102 will be described below. The output 110 outputs information related to the sensor estimated to be the specific sensor by the estimator 109 (step S104).

Hereinafter, an example of a method of executing the processing of step S102 will be described in the order of (1) process of visualizing mode information acquisition information using a trajectory shape by performing a mode information acquisition process for extracting features of various abnormalities, calculating dissimilarity on the basis of quantification information of a trajectory shape obtained by quantifying a visualized trajectory shape, and generating a state transition matrix using a clustering result on the basis of the calculated dissimilarity and (2) detailed determination using a state transition matrix.

[Processing Flow: (1) Process of Visualizing Mode Information Acquisition Information Using Trajectory Shape by Performing Mode Information Acquisition Process for Extracting Features of Various Abnormalities, Calculating Dissimilarity on Basis of Quantification Information of Trajectory Shape Obtained by Quantifying Visualized Trajectory Shape, and Generating State Transition Matrix Using Clustering Result Based on Calculated Dissimilarity]

Figure 14:
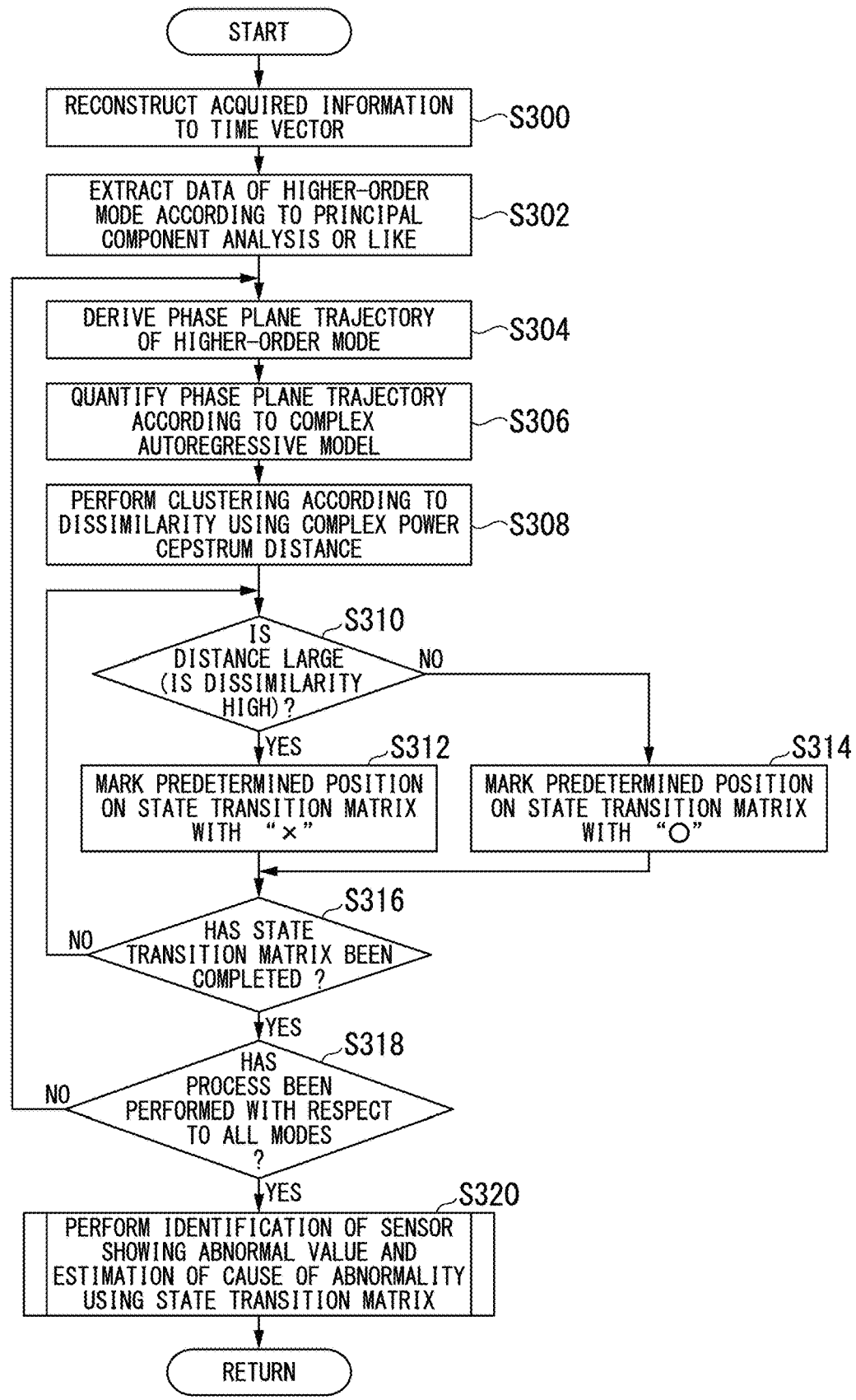
FIG. 14 is a flowchart showing a flow of a series of processing steps of an estimation process of a specific sensor according to step S102.

FIG. 14 is a flowchart showing a flow of a series of processing steps of an estimation process of the specific sensor according to step S102. Hereinafter, an example in which the analyzer 104 extracts a feature of an abnormality from time-series information obtained from each sensor according to the "first mode information acquisition process," the deriver 106 generates a two-dimensional phase plane trajectory by selecting a combination regarded as appropriate from a plurality of modes including a $0^{th}$-order mode in which the "mode information acquisition process" is not performed, the dissimilarity calculator 108 quantifies a trajectory shape, and the estimator 109 generates a state transition matrix using a result of performing clustering based on dissimilarity calculated on the basis of the quantified trajectory shape will be described with reference to FIG. 14. In the example of FIG. 13, a case in which the threshold value is not set and it is difficult to estimate whether or not the sensor shows an abnormal value from the time-series information of the single sensor will be described. When the threshold value is not set, the abnormality estimation of diagonal elements in which the elements shown on the vertical axis and the horizontal axis match is performed after waiting for the completion of the state transition matrix in a portion below the diagonal elements. As described above, because the state transition matrix has the vertical symmetry across diagonal elements in which the elements shown on the vertical axis and the horizontal axis match and "sensor A-sensor B" and "sensor B-sensor A" are not distinguished in the present embodiment, it is only necessary to generate a lower half including the diagonal elements as shown in FIG. 12. Also, as shown in the above embodiment, as in FIG. 12, the following description will be given in a state in which it is assumed that the abnormality estimation is performed on measured values of the six sensors from "sensor A" to "sensor F." For example, the analyzer 104 converts the detection result information 300 acquired by the acquirer 102 into a time vector for each sensor using a sliding window method so that the "first mode information acquisition process" is performed (step S300). The analyzer 104 considers that data sets reconstructed to multivariate data according to the above conversion are independent of each other and extracts features of various abnormalities as a plurality of mode information elements according to a multivariate analysis method using a matrix decomposition method for each sensor (step S302).

Next, the deriver 106 derives a phase plane trajectory representing a change between two sensors on a two-dimensional phase plane by selecting a mode for use in each of the vertical axis and the horizontal axis for deriving the phase plane trajectory using a plurality of mode information elements for each sensor acquired by the analyzer 104 and combining sensors two by two among sensors of the vertical axis and the horizontal axis (step S304). The phase plane trajectory derived by the deriver 106 is, for example, a phase plane in which a first axis (for example, a horizontal axis) represents a mode-1 result x of "sensor A" and a second axis (for example, a vertical axis) represents a mode-1 result y of "sensor B." The deriver 106 derives a trajectory by connecting coordinates (coordinates $(x_1, y_1), \ldots,$ coordinates $(x_n, y_n)$) representing elements whose detection timings match among elements $\{x_1, x_2, \ldots, x_n\}$ included in the mode-1 result x and elements $\{y_1, y_2, \ldots, y_n\}$ included in the mode-1 result y with a straight lime in the order of detection times.

The dissimilarity calculator 108 quantifies the derived phase plane trajectory shape according to a quantitative method using a complex autoregression coefficient (step S306). The dissimilarity calculator 108 calculates dissimilarity between the quantified phase plane trajectory shape and a plurality of quantified trajectory shapes of the normal time shown in the trajectory shape information 204 (for example, a complex power cepstrum distance Dc), clusters measurement results according to a magnitude of a distance associated with normal information, and visualizes a clustering result using a visualization method like a dendrogram shown in FIG. 11 (step S308). The estimator 109 estimates that dissimilarity associated with the normal example is high and one or both of a pair of sensors have measured abnormal values when the detection target is classified as an example different from a group formed by a plurality of normal examples using the above classification result and estimates that dissimilarity associated with the normal example is low and both of a pair of sensors have not measured an abnormal value when the detection target is classified into a group that is the same as the group formed by the normal examples (step S310).

In the estimator 109, a clustering result is entered in the state transition matrix as shown in FIG. 12. As described above, in the state transition matrix, a target pair of sensors are associated with the vertical axis and the horizontal axis and the abnormality estimation result is written. For example, if it is estimated that a trajectory shape including a pair of sensors of "sensor A" and "sensor B" has high dissimilarity in association with the normal state (i.e., an abnormal value is shown), a corresponding location of the state transition matrix (an element of "sensor A" of the horizontal axis and "sensor B" of the vertical axis or a field of "sensor A-sensor B") is marked with "x" (step S312). Also, when it is estimated that a value is not abnormal, the corresponding location of the state transition matrix is marked with "o" (step S314).

The estimator 109 determines whether or not the state transition matrix generated in step S312 and step S314 has been completed (step S316). The estimator 109 iterates the processing of steps S304 to S316 until the state transition matrix is completed. In the following description, a method in which a person who performs the abnormality detection selects a plurality of modes to be used for creating the state transition matrix in advance when an abnormality is determined and the estimator 109 generates a state transition matrix formed by "sensors A to F" as shown in FIG. 12 will be described. In this case, one state transition matrix is generated for each selected mode. The analyzer 104 determines whether state transition matrices have been completed in all selected modes (step S318). The estimator 109 iterates the processing of steps S304 to S318 until the state transition matrices are completed in all the modes which are required. It is determined that the state transition matrix has been completed once at a point in time when an entry in a portion below the diagonal elements has ended when matching elements are the diagonal elements among elements whose sensor names shown on the horizontal axis and the vertical axis of the state transition matrix do not match and the abnormality estimation of a diagonal element whose sensor names shown on the horizontal axis and the vertical axis match using the state transition matrix and the like are performed in the next step S320. As described above, a case in which the threshold value is not set, it is difficult to determine whether or not an abnormal value is shown from the time-series information of a single sensor, and a diagonal element whose sensor names shown on the vertical axis and the horizontal axis match is blank will be described. If an abnormality desired to be detected is determined in advance and an optimum mode to be investigated is known in advance, it is only necessary to provide a state transition matrix only in a necessary mode.

In the estimation of the estimator 109 related to an element whose sensor names shown on the vertical axis and the horizontal axis match (for example, the above-defined element of "sensor A-sensor A") among elements of the state transition matrix, it is only necessary to estimate that there is an abnormal value ("x") when a corresponding value exceeds a threshold value if the threshold value is set and there is no abnormal value ("o") when the corresponding value does not exceed the threshold value and to enter an estimation result to a corresponding location of the state transition matrix. On the other hand, when the threshold value is not set and it is difficult to determine whether or not a value is abnormal from the single sensor information, the estimator 109 identifies a sensor showing an abnormal value together with a following exhaustive determination of a sensor failure or a system abnormality after all elements whose sensor names do not match (for example, elements of "sensor A-sensor B," "sensor A-sensor C," and the like) in the state transition matrix are filled in.

The estimator 109 performs the identification of a sensor showing an abnormal value (the estimation of an abnormality of an element whose sensor names shown on the vertical axis and the horizontal axis match), the determination of a sensor failure or a system abnormality, or the estimation of a cause when it is determined that a system has failed on the basis of information about a correlation between sensors stored in the correlation information 202, the reference information 206 storing information about a maintenance history of a sensor or its peripheral part, or the like using the state estimation matrix in which an entry in an element whose sensor names shown on the vertical axis and the horizontal axis do not match has been completed (step S320).

[Processing Flow: (2) Detailed Determination Using State Transition Matrix]

Figure 15:
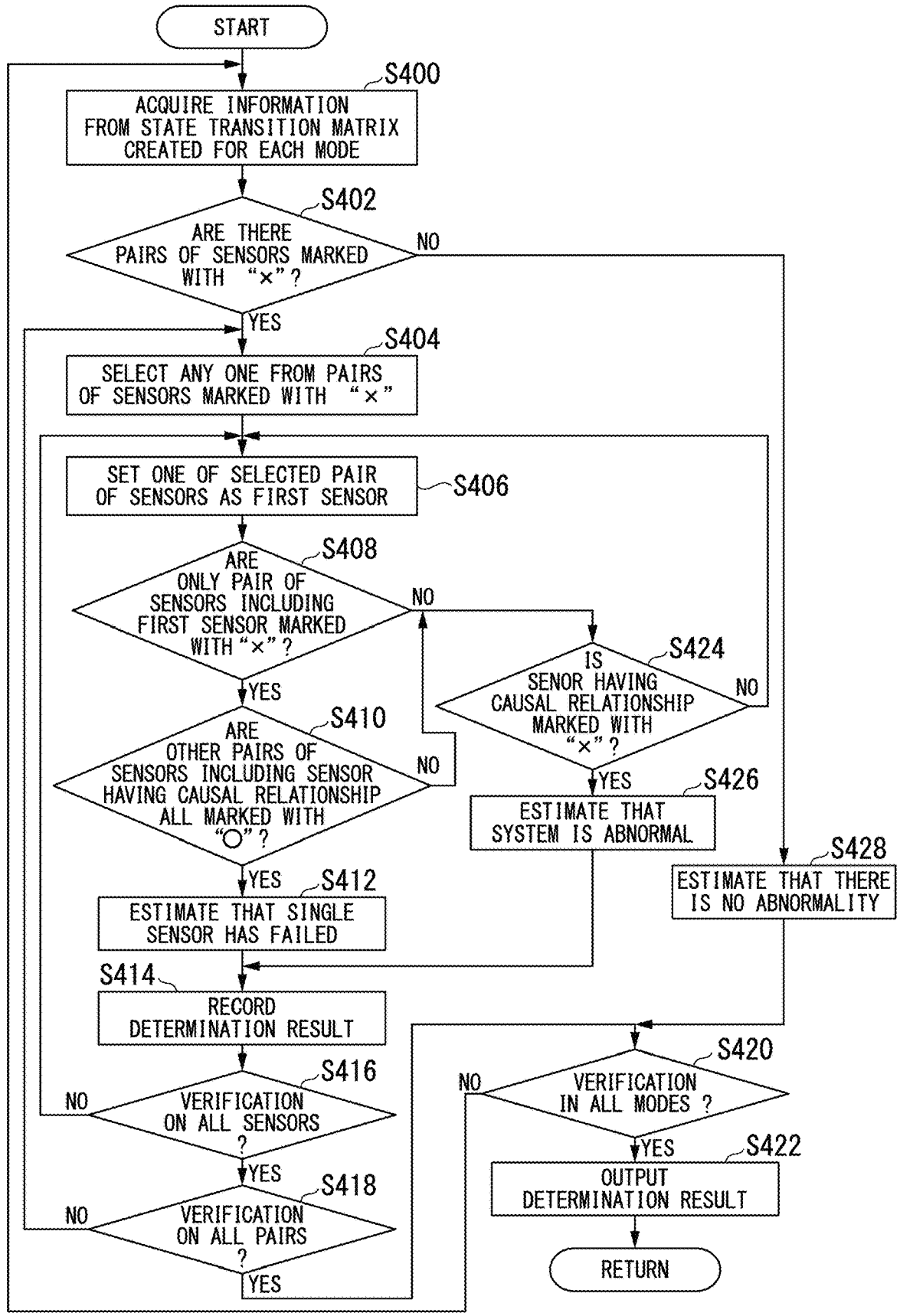
FIG. 15 is a flowchart showing a flow of a series of processing steps of an estimation process of a specific sensor according to step S302.

Hereinafter, the processing of step S320 in which the estimator 109 makes a detailed determination using a state transition matrix will be described. FIG. 15 is a flowchart showing a flow of a series of processing steps of an estimation process of the specific sensor according to step S320. In the flowchart shown in FIG. 15, an example in which there are six sensors "sensor A," "sensor B," "sensor C," "sensor D," "sensor E," and "sensor F" that are targets for calculating various types of index values and trajectories and it is known that correlated sensors of the six sensors are only "sensor A" and "sensor B" according to the correlation information 202 will be described. In this example, a case in which a plurality of sensor failures do not occur will be described. The estimator 109 acquires information of the state transition matrix in which an entry in the elements whose sensor names do not match has ended (step S400), and investigates whether or not there are pairs of sensors marked with "x" (step S402). When there are no pairs of sensors marked with "x," the estimator 109 estimates that there is no abnormality (step S428) and determines whether verification has been performed on state transition matrices of all modes selected in advance (step S420). The procedure after step S420 will be described together with the following steps. When there are pairs of sensors marked with "x," one pair of sensors (for example, a pair of sensors "sensor A" and "sensor B" from the elements of "sensor A" of the vertical axis and "sensor B" of the horizontal axis) are selected from the pairs of sensors (step S404). One of the selected pair of sensors (for example, "sensor B") is assumed to be an estimation target sensor (hereinafter referred to as a first sensor) for estimating whether or not it is a specific sensor (step S406). At this time, the sensor already selected as the first sensor in an identical pair of an identical state transition matrix is not selected as the first sensor.

The estimator 109 investigates whether or not a pair of sensors not including the first sensor are also marked with "x" (step S408) and investigates a sensor correlated with the first sensor ("sensor A" in the present example) on the basis of the correlation information 202 when a pair of sensors not including the first sensor are also marked with "x" and investigates whether or not all fields of pairs of sensors formed by sensors other than the first sensor are marked with "o" on the state transition matrix (step S410). When all have been marked with "o," the estimator 109 determines that the first sensor has a "sensor failure" because a correlation (or a causal relationship) that should be present has been lost (step S412). At this time, the estimator 109 marks a determination result with "x" in the corresponding field of the state transition matrix (a field of "sensor B-sensor B" of the state transition matrix when the first sensor is the "sensor B") and indicates that the sensor has failed (step S414). Alternatively, as described above, another symbol such as "#" may be used to indicate that the sensor has failed to distinguish the sensor failure from the system abnormality around the sensor. Because a case in which all are not marked with "o" (this case is not present because only pairs of sensors including the first sensor are marked with "x" in S408) corresponds to NO in S408, the process moves to step S424 and detailed analysis is performed. When all fields of the pairs of sensors formed by the sensors other than the first sensor are marked with "o" on the state transition matrix and it is estimated that the first sensor has failed, the process moves to step S416 after the recording in the state transition matrix is completed in S414. It is confirmed whether both sensors of a pair of the sensors selected in S404 has been verified as first sensors in step S416 and the verification is continuously performed by returning to step S406 if a process of verifying both sensors as the first sensors has not been completed. When the verification on both sensors has been completed, the process returns to S404, and another pair of sensors marked with "x" are selected to continue the verification. When all of this has been completed, the process proceeds to step S420. It is determined whether the verification has been completed in all the modes selected in advance and the process returns to S400 when the verification has not been completed. When the verification has been completed, the process proceeds to step S422 and the state transition matrix completed according to the determination result and the determination result are output by the output 110. Here, although a single sensor failure has been described as an example, the estimator 109 performs the estimation in a similar procedure even if a plurality of sensors fail.

In this case, the output 110 may output all information related to the sensor estimated to be the specific sensor or may output information related to some sensors estimated to be specific sensors.

When a pair of sensors other than the pair of sensors including the first sensor are marked with "x" in step S408, it is investigated whether a sensor correlated with the first sensor is included in the pair on the basis of the correlation information 202 (step S424). When a field of a pair of sensors formed by a certain sensor correlated with the first sensor and a sensor other than the first sensor is marked with "x," the correlation between the sensors has not failed, so that it is estimated that there is a "system abnormality" around the first sensor instead of the sensor failure. The process proceeds to step S414, a field of the first sensor of the diagonal element of the state transition matrix (a field of "sensor A-sensor A" having the same sensor names of the vertical axis and the horizontal axis if the first sensor is "sensor A") is marked with "x," the system abnormality instead of the sensor failure is recorded, and a process from step S416 is executed as described above.

According to the above-described process, when the "sensor failure" has been estimated, an actual sensor confirms a cause of a sensor failure with respect to a sensor estimated to have a sensor failure during inspection work and measures such as the replacement of a part of the sensor and the replacement of the sensor itself are taken if necessary. When the "system abnormality" has been estimated, it is possible to identify a sensor that has detected an abnormal value using a state transition matrix and exhaustively estimate a cause of an abnormality on the basis of the correlation information 202 between sensors or the reference information 206 storing a maintenance history of a system or a device near a sensor showing an abnormal value and the like. For example, when the system abnormality is diagnosed, a pressure sensor and a flowmeter that measure internal leakage show abnormal values, and the reference information 206 shows that a replacement deadline of a seal part is approaching, internal leakage due to wear of the seal is suspected, so that the maintenance of the system can be efficiently performed by identifying a failure location from the inspection of the seal part in the inspection work.

[Regarding Processing of Step S102]

Although a flowchart when the analyzer 104 sequentially executes (1) "mode information acquisition method of extracting features of various abnormalities," (2) "method of visualizing mode information using a trajectory shape," (3-1) "method of quantifying a trajectory shape generated according to mode information," (3-2) "method of calculating dissimilarity based on quantification information of the trajectory shape and performing clustering based on dissimilarity," and (4) "method of performing detailed estimation by integrating calculation results of the dissimilarity calculator according to a state transition matrix" in step S102 for estimating the specific sensor has been described above, the embodiment of the present invention is not limited thereto. In step S102, it is possible to execute a flowchart by combining appropriate procedures among the procedures (1) to (4) according to the purpose of abnormality detection. According to the properties of the abnormality, it may be more appropriate to generate the phase plane trajectory using information of the $0^{th}$-order mode in which the higher-order mode conversion is not performed (or by appropriately making a combination with higher-order mode information). Also, it is not always necessary to generate a state transition matrix for all modes. When a feature of an abnormality desired to be detected is known, a calculation processing time period required for detection can be shortened by selecting an appropriate combination of modes and performing abnormality detection. Also, it is not always necessary to generate phase plane trajectories for all pairs of sensors. The method described here as an embodiment is a method suitable for analyzing the recorded information offline. However, for example, if the purpose is to make an emergency stop by quickly detecting an abnormality online, it is possible to limit a mode to a target failure mode and shorten a time period required for abnormality detection by narrowing down pairs of sensors of an analysis target. If detection sensitive to a time of 0.01 seconds is not necessary, an exhaustive analysis method is preferable even if analysis is time-consuming for the purpose of abnormality detection for performing efficient maintenance, estimation of the cause, detection of signs of abnormalities, and the like. Also, a process other than the mode information acquisition process such as standardization for aligning the mean and variance of the detection results may be added before the mode information acquisition process, or such a process may be performed after the mode information acquisition process. As described above, the mode information acquisition process also includes a "first mode information acquisition process," a "second mode information acquisition process," and a combination of these processes and it is possible to derive a trajectory by combining any information according to which mode information has been selected to derive a phase plane trajectory or to calculate dissimilarity in a similar process from a trajectory formed by normal time-series information that does not use a phase plane.

[Regarding Correlation Estimation]

The above-described processing flow for abnormality detection using the phase plane trajectory shape between the two sensors can also be used when the correlation between the two sensors is estimated. For example, FIG. 11 shows a result of determining the dissimilarity of the phase plane trajectory formed by "sensor A" and "sensor B" among a plurality of normal examples. However, it is possible to perform clustering into a correlated group and an uncorrelated group by generating phase plane trajectories with respect to all sensor combinations in the normal example, designating a pair of sensors whose correlation is apparent from a physical relational expression as a pair of models, and comparing dissimilarities in a plurality of modes without comparing dissimilarities of a detection target and phase plane trajectory shapes formed by "sensor A" and "sensor B" among the plurality of normal examples. It is possible to generate a correlation matrix between sensors using the above-described abnormality detection device if "o" is marked when an analysis result using the abnormality detection device described above represents that it is estimated that there is a correlation on the above-described state transition matrix and "x" is marked when the analysis result represents that it is estimated that there is no correlation. By investigating a correlation in a plurality of modes, it is possible to determine a correlation even if there is a lot of noise and it is difficult to determine. Although the generation of a correlation table can be performed in parallel with the abnormality determination, the correlation table may be generated in advance using normal data and recorded in the correlation information 202.

[Regarding Mode Extraction]

Although an example in which various mode information elements are extracted according to a plurality of modes by reconstructing data obtained by converting a time-series data of each sliding window into a set of vectors to multivariate data having time information of a near point as a variable and performing multivariate analysis using a matrix decomposition method in a process named the "first mode information acquisition process" has been described above, the "second mode information acquisition process" is also included and a method of extracting various mode information elements is not limited to principal component analysis. The deriver 106 may perform abnormality feature extraction by applying a method of extracting features of a plurality of modes according to multivariate analysis using a matrix decomposition method in which mode information acquisition similar to principal component analysis such as factor analysis, sparse principal component analysis, fuzzy principal component analysis, kernel principal component analysis, probabilistic principal component analysis, or robust principal component analysis is possible. Also, the present invention is also effective when a measured value of a sensor interacts with a lag because it is possible to introduce a lag structure using a result of "first mode information acquisition" in a method of principal component analysis and factor analysis in a known time domain named the "second mode information acquisition" as described in the embodiment. It is possible to reduce overlooking and false detections and enable accurate abnormality detection by selecting a mode suitable for the properties of the abnormality to be detected, such as a change in frequency or an abnormality that occurs with a lag. Also, because a lag structure is introduced, reconstruction to multivariate data is performed, and a noise filter-like effect is produced in a series of processing steps to which principal component analysis is applied in the "first mode information acquisition process," it is possible to remove noise from noisy data and reduce false detections, for example, by adjusting the vectorization dimension in accordance with a detection result at the time of reconstruction to multivariate data determined according to a window width or the like.

[Regarding Other Estimation Methods for Specific Sensors]

Although a case in which the analyzer 104, the deriver 106, the dissimilarity calculator 108, and the estimator 109 estimate the specific sensor according to the procedures of (1) to (4) has been described above, the embodiment of the present invention is not limited thereto. When the analyzer 104, the deriver 106, the dissimilarity calculator 108, and the estimator 109 acquire information such as the detection result information 300, the specific sensor may be estimated on the basis of a detection result of a normal time and a learning model learned to output a result of estimating a sensor that has measured an abnormal value of high dissimilarity as a specific sensor. In this case, the estimator 109 inputs the detection result shown in the detection result information 300 to the learning model, and estimates the sensor obtained as an output as the specific sensor.

Although modes for carrying out the present invention have been described using embodiments, the present invention is not limited to the embodiments and various modifications and substitutions can also be made without departing from the scope and spirit of the present invention.

REFERENCE SIGNS LIST

1 Abnormality detection device,
100 Controller
102 Acquirer
104 Analyzer
106 Deriver
108 Dissimilarity calculator
109 Estimator
110 Output
200 Storage
202 Correlation information
204 Trajectory shape information
206 Reference information
300 Detection result information
Dc Complex power cepstrum distance
Orb1 Trajectory
Orb2 Trajectory
x, y Mode-1 result
z1, z2 Complex autoregression coefficient
z1, z2 Complex power cepstrum distance

The invention claimed is:

1. An abnormality detection device comprising a processor configured to execute a program to:
acquire a plurality of detection results of a plurality of sensors that have detected a state of a detection target at predetermined time intervals; and
estimate a specific sensor in which an abnormality is likely to occur among the plurality of sensors on the basis of a plurality of mode information elements obtained by performing a plurality of mode information acquisition processes of extracting features according to properties of the abnormality with respect to each of the plurality of detection results,
wherein the processor is further configured to execute the program to:
derive a trajectory in which two mode information elements are combined, an element included in one mode information element is set as a value on a first axis of a two-dimensional phase plane, an element included in the other mode information element is set as a value on a second axis of the phase plane, and elements of the same time are set as coordinates; and
estimate the specific sensor on the basis of the trajectory, wherein when a shape of the trajectory is different from a shape of a trajectory in a normal state, the processor is further configured to execute the program to estimate the sensor related to the trajectory as the specific sensor, and wherein the processor is further configured to execute the program to:
acquire the plurality of mode information elements by reconstructing time-series information of the detection results at the predetermined time intervals to multivariate data of each sensor according to a time structure and analyzing the multivariate data according to a multivariate analysis method; and
estimate the specific sensor on the basis of the plurality of mode information elements.

2. The abnormality detection device according to claim 1, wherein the processor is further configured to execute the program to introduce the time structure into the multivariate data according to a sliding window method.

3. The abnormality detection device according to claim 2, wherein the processor is further configured to execute the program to remove noise of the multivariate data by setting a window width of the sliding window method to a predetermined value or more.

4. The abnormality detection device according to claim 1, wherein the processor is further configured to execute the program to reconstruct the detection result to multivariate data by causing each sensor group where two or more sensors have been selected to combine detection results of the same time of the sensor group for each detection time and to acquire the plurality of mode information elements by analyzing the multivariate data according to a multivariate analysis method.

5. The abnormality detection device according to claim 4, wherein the processor is further configured to execute the program to reconstruct mode information for each sensor to multivariate data by causing each sensor group where two or more sensors have been selected to combine mode information obtained through multivariate analysis from the multivariate data for each sensor according to an introduction of a time structure for each detection time and to acquire the plurality of mode information elements by analyzing the multivariate data according to a multivariate analysis method.

6. The abnormality detection device according to claim 1, wherein the processor is further configured to execute the program to acquire the mode information for a predetermined type of sensor or mutually correlated sensors with respect to a predetermined number of sensors among the plurality of sensors.

7. The abnormality detection device according to claim 1, wherein the processor is further configured to execute the program
to derive a trajectory on a two-dimensional plane in which a first axis of a coordinate plane represents information related to a measurement time of the mode information and a second axis of the coordinate plane represents information related to a measured value of the mode information.

8. The abnormality detection device according to claim 1, wherein the processor is further configured to execute the program to derive the trajectory in relation to a correlated sensor.

9. The abnormality detection device according to claim 1, wherein the processor is further configured to execute the program to:
calculate dissimilarity on the basis of a shape of the trajectory; and
estimate the sensor related to the dissimilarity as the specific sensor when the dissimilarity is greater than dissimilarity between data elements of a normal time.

10. The abnormality detection device according to claim 9,
wherein the processor is further configured to execute the program to classify a plurality of normal data elements and detection target data on the basis of the dissimilarity according to a clustering method; and
estimate the sensor as the specific sensor when a detection target has been classified into a cluster different from that of the normal data.

11. The abnormality detection device according to claim 10,
wherein the processor is further configured to execute the program to:
generate correlation information representing a correlated sensor; and
generate a result obtained by estimating that a combination of sensors whose correlation is determined are classified into a correlated sensor group as the correlation information on the basis of a result of clustering a phase plane trajectory shape formed by a combination of correlated sensors and a phase plane trajectory shape formed by a combination of sensors determined to be correlated according to dissimilarity.

12. The abnormality detection device according to claim 1, wherein the processor is further configured to execute the program to generate a state transition matrix having an element for estimating whether or not the sensors and a combination of the sensors show an abnormal value for each combination of the sensors and to estimate the specific sensor or estimates a cause of an abnormality or a type of abnormality related to the specific sensor on the basis of the generated state transition matrix.

13. The abnormality detection device according to claim 12, wherein the processor is further configured to execute the program to estimate a cause of an abnormality or a type of abnormality related to the specific sensor on the basis of the presence or absence of a failure of a correlation between the sensors in the state transition matrix.

14. The abnormality detection device according to claim 12, wherein, when there is an element showing an abnormal value in the state transition matrix and an element of a sensor correlated to a sensor related to the element does not show an abnormal value, the processor is further configured to execute the program to estimate a correlation between the sensors has failed and to estimate that the sensor related to the element showing the abnormal value has failed.

15. The abnormality detection device according to claim 12, wherein, when there is an element showing an abnormal value in the state transition matrix and an element of a sensor correlated to a sensor correlated to the element shows an abnormal value, the processor is further configured to execute the program to estimate a correlation between the sensors has not failed and to estimate that a detection target system of the sensor has failed.

16. A non-transitory computer-readable storage medium storing a program for causing a computer to:
acquire a plurality of detection results of a plurality of sensors that have detected a state of a detection target at predetermined time intervals; and
estimate a specific sensor in which an abnormality is likely to occur among the plurality of sensors on the basis of a plurality of mode information elements obtained by performing a plurality of mode information acquisition processes of extracting features according to properties of the abnormality with respect to each of the plurality of acquired detection results,
wherein the program is further for causing the computer to:
derive a trajectory in which two mode information elements are combined, an element included in one mode information element is set as a value on a first axis of a two-dimensional phase plane, an element included in the other mode information element is set as a value on a second axis of the phase plane, and elements of the same time are set as coordinates; and
estimate the specific sensor on the basis of the trajectory,
wherein when a shape of the trajectory is different from a shape of a trajectory in a normal state, the program is further for causing the computer to estimate the sensor related to the trajectory as the specific sensor, and
wherein the program causes the computer to:
acquire the plurality of mode information elements by reconstructing time-series information of the detection results at the predetermined time intervals to multivariate data of each sensor according to a time structure and analyzing the multivariate data according to a multivariate analysis method; and
estimate the specific sensor on the basis of the plurality of mode information elements.

17. An abnormality detection device comprising a processor configured to execute a program to:
acquire a plurality of detection results of a plurality of sensors that have detected a state of a detection target at predetermined time intervals;
acquire a plurality of mode information elements by reconstructing time-series information of the detection results to multivariate data for each sensor according to a time structure and acquire mode information which is time-series information of a score on a principal axis from which a feature has been extracted for each sensor by analyzing the multivariate data according to a multivariate analysis method;
derive a trajectory in which an element included in one mode information element of two mode information elements selected from a plurality of mode information elements is set as a value on a first axis of a two-dimensional phase plane, an element included in the other mode information element is set as a value on a second axis of the phase plane, and elements of the same time are set as coordinates; and
estimate two sensors related to the trajectory as specific sensors in which an abnormality is likely to occur when a shape of the trajectory is different from a shape of a trajectory in a normal state, wherein the processor is further configured to execute the program to:
estimate the specific sensors on the basis of the plurality of mode information elements.

18. The abnormality detection device according to claim 17,
wherein the processor is further configured to execute the program to: derive a trajectory based on mode information related to a sensor and mode information related to another sensor with respect to each of the plurality of sensors;
estimate the sensor and the other sensor as the specific sensors on the basis of each trajectory;
generate a state transition matrix having an element showing whether or not a combination of the sensors has been estimated as the specific sensors for each sensor and each combination of the other sensors with respect to each of the plurality of sensors; and
estimate a sensor in which an abnormality is likely to occur on the basis of the generated state transition matrix.

* * * * *